United States Patent
Achen et al.

(10) Patent No.: US 9,814,172 B2
(45) Date of Patent: *Nov. 14, 2017

(54) APPARATUSES, METHODS, AND SYSTEMS FOR PROVIDING DOWN FORCE FOR AN AGRICULTURAL IMPLEMENT

(71) Applicant: KINZE MANUFACTURING, INC., Williamsburg, IA (US)

(72) Inventors: Courtney N. Achen, Iowa City, IA (US); Marvin Bachman, Marengo, IA (US); Rhett Schildroth, North Liberty, IA (US); Merlan Rolffs, Pella, IA (US); Michael J. Myers, Williamsburg, IA (US); John Kollman, Iowa City, IA (US); John P. Mulherin, Cedar Rapids, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/665,724

(22) Filed: Mar. 23, 2015

(65) Prior Publication Data

US 2015/0264857 A1 Sep. 24, 2015

Related U.S. Application Data

(60) Provisional application No. 61/968,820, filed on Mar. 21, 2014.

(51) Int. Cl.
*A01C 5/06* (2006.01)
*A01B 63/32* (2006.01)
(Continued)

(52) U.S. Cl.
CPC .............. *A01B 63/32* (2013.01); *A01B 49/06* (2013.01); *A01B 61/044* (2013.01); *A01B 63/28* (2013.01);
(Continued)

(58) Field of Classification Search
CPC ......... A01B 63/30; A01B 63/32; A01B 49/06; A01B 61/044; A01C 5/062
See application file for complete search history.

(56) References Cited

U.S. PATENT DOCUMENTS

| | | | | |
|---|---|---|---|---|
| 4,176,721 A | * | 12/1979 | Poggemiller | .......... A01B 63/22 111/903 |
| 6,389,999 B1 | * | 5/2002 | Duello | .................. A01C 5/064 111/200 |

(Continued)

FOREIGN PATENT DOCUMENTS

| | | |
|---|---|---|
| EP | 2497348 B2 | 3/2014 |
| WO | 2009149473 A2 | 12/2009 |
| WO | 2012149367 A1 | 11/2012 |

OTHER PUBLICATIONS

European Patent Office, "International Search Report and Written Opinion", Issued in Connection to International Application No. PCT/US2015/022018, dated Sep. 22, 2015.

*Primary Examiner* — John G Weiss
(74) *Attorney, Agent, or Firm* — McKee, Voorhees and Sease, PLC

(57) ABSTRACT

An agricultural planter includes systems, methods, and apparatus for providing down force pressure at row units of the planter. The row units may include an electric linear actuator connected to linkages of the row units to provide and maintain a down force pressure for the row unit. The linkage may also be removed and replaced with a strut or like mechanism to apply a direct down force pressure to components of the row unit. One or more sensors can be included to obtain information related to the ground to automatically adjust the amount of down force provided based upon a ground characteristic in order to maintain a substantially uniform furrow depth.

12 Claims, 23 Drawing Sheets

(51) Int. Cl.
  *A01B 61/04*    (2006.01)
  *A01B 49/06*    (2006.01)
  *A01B 63/28*    (2006.01)
  *A01C 7/20*     (2006.01)

(52) U.S. Cl.
  CPC .............. *A01C 5/062* (2013.01); *A01C 5/064* (2013.01); *A01C 7/203* (2013.01)

(56) References Cited

U.S. PATENT DOCUMENTS

| | | | | |
|---|---|---|---|---|
| 8,573,319 | B1* | 11/2013 | Casper | A01B 63/112 |
| | | | | 172/4 |
| 8,843,269 | B2* | 9/2014 | Anderson | B60C 23/002 |
| | | | | 134/18 |
| 8,909,436 | B2* | 12/2014 | Achen | A01C 5/062 |
| | | | | 111/134 |
| 8,924,092 | B2* | 12/2014 | Achen | A01B 49/04 |
| | | | | 111/200 |
| 9,107,337 | B2* | 8/2015 | Bassett | A01B 71/02 |
| 9,137,939 | B2* | 9/2015 | Winick | A01B 63/008 |
| 9,232,687 | B2* | 1/2016 | Bassett | A01B 61/044 |
| 2013/0247802 | A1* | 9/2013 | Truax | A01C 7/006 |
| | | | | 111/61 |
| 2014/0277959 | A1* | 9/2014 | Wagers | A01C 21/005 |
| | | | | 701/50 |

\* cited by examiner

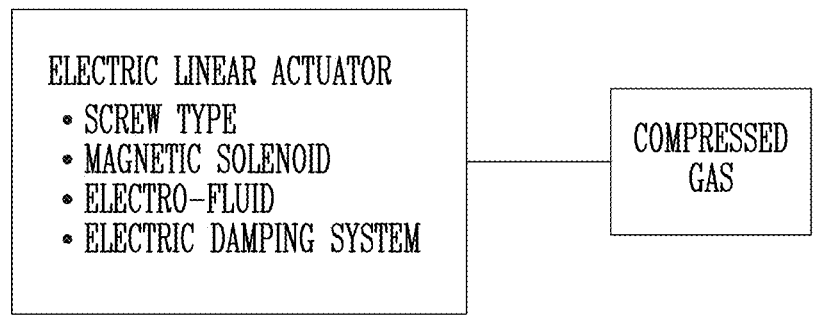
Fig. 25
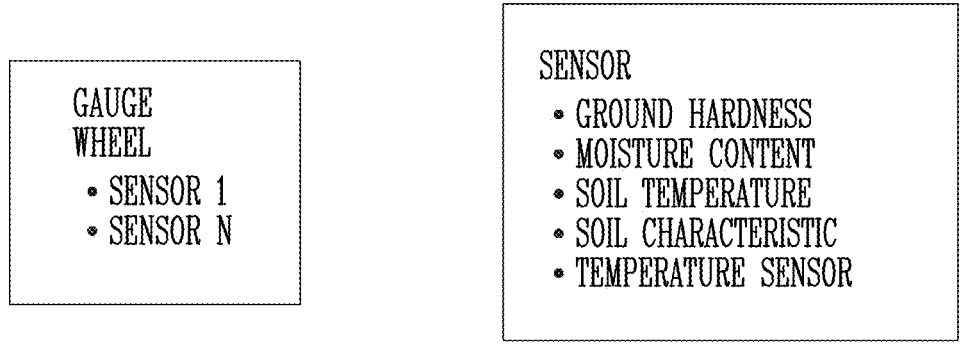
Fig. 26
Fig. 27

APPARATUSES, METHODS, AND SYSTEMS FOR PROVIDING DOWN FORCE FOR AN AGRICULTURAL IMPLEMENT

CROSS-REFERENCE TO RELATED APPLICATIONS

This application claims priority under 35 U.S.C. §119 to provisional application Ser. No. 61/968,820, filed Mar. 21, 2014, herein incorporated by reference in its entirety.

FIELD OF THE INVENTION

The invention relates generally to agricultural implements. More specifically, but not exclusively, the invention relates to systems, methods, and apparatus for providing down force pressure at row units of an agricultural planter.

BACKGROUND OF THE INVENTION

An agricultural row crop planter is a machine built for precisely distributing seed into the ground. The row crop planter generally includes a horizontal toolbar fixed to a hitch assembly for towing behind a tractor or other implement. Row units including seed meters are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing, a seed disc, and a seed chute. The housing is constructed such that it creates a reservoir to hold a seed pool. The seed disc resides within the housing and rotates about a generally horizontal central axis. As the seed disc rotates, it passes through the seed pool where it picks up individual seeds. The seeds are subsequently dispensed into the seed chute where they drop into the seed furrow.

As the agricultural planter row unit travels across fields with variable soil types, soil moisture, residue levels and topography, it can be difficult to maintain constant seed depth and other parameters due to changing conditions which would ideally require varying the row unit down force pressure. For example, farming with higher residue levels also requires higher row unit down force levels as row cleaners, coulters and other attachments require applied force to keep them in the ground and at consistent depths.

At the same time, in many locations there are immovable rocks or other obstructions at or below the soil surface which require the planter row unit to be able to quickly and freely (without undue increase in the row unit down force) rise up and over the obstruction freely and then quickly move back down, leaving a minimum amount of the row unplanted. All this must be accomplished at continually increasing ground speeds.

Traditionally, springs have been used to urge row units downward. Air bag systems have also been used to overcome some of the drawbacks to mechanical spring systems. Air systems provide a more uniform down force through the vertical range of travel, compared to springs, and are somewhat easier to adjust than springs. However due to the compressibility of air and the relatively large volumes required, changes in air pressure are very cumbersome and not adaptable to very fast change and response to in-cab controls on the go. Air bag systems typically have a very large cross-sectional area in relation to the hose feeding the air spring with pressure, which can provide a large multiplication of force and allow for relatively good isolation of one row unit relative to another. However, air bag systems typically do not allow for rapid change of the force being applied, because of the large volume of the air spring in relation to the cross section of the hose supplying the air. Furthermore, as computers and GPS systems have allowed crop production to be managed in a location-specific way as an implement moves through the field, it has become necessary to achieve more rapid changes in the setting or adjustment of the implement. In the case of a planter row unit, it is also necessary to generate a large amount of force. Each individual planter row unit must be able to react to the soil it encounters independently of the other row units.

Therefore, there is a need in the art for improved apparatuses, systems, and/or methods for providing down force at the row units in a way that provides for a sufficient amount of down force for varying types of row units, while also providing a near instantaneous response to variations in soil conditions, obstructions, and other changes in a field being planted.

SUMMARY OF THE INVENTION

Thus, it is a principle object, feature, and/or advantage of the invention to overcome deficiencies in the art.

It is another object, feature, and/or advantage of the invention to provide an electric linear actuator to provide down force pressure at various locations of the row unit.

It is yet another object, feature, and/or advantage of the invention to provide a strut in place of a four bar linkage of a row unit.

It is yet a further object, feature, and/or advantage of the invention to connect a seed meter to a toolbar via a solenoid.

It is another object, feature, and/or advantage of the invention to provide a row unit that is attached to a toolbar via a slider either behind or underneath the toolbar.

It is yet another object, feature, and/or advantage of the invention to provide a moving actuator to the opening wheel of a row unit to reduce the amount of force needed for the wheel to penetrate the ground.

It is still another object, feature, and/or advantage of the invention to provide a monitoring and/or foresight system for use with a down force pressure provider to view ahead of the row unit in order to preload the down force provided.

It is yet a further object, feature, and/or advantage of the invention to provide a rotating bit to open a furrow in the ground for a row unit.

These and/or other objects, features, and advantages of the present invention will be apparent to those skilled in the art. The present invention is not to be limited to or by these objects, features and advantages. No single embodiment need provide each and every object, feature, or advantage.

The invention relates generally to agricultural implements, and more particularly to methods, apparatuses, and systems for providing down force pressure or pressures at the row units of the agricultural implement. The down force pressure is utilized to maintain a pressure such that the row units are able to maintain a substantially similar depth when planting a material (seed) throughout a field. As the soil types, compositions, obstructions, and other factors affect the general makeup of fields, the down force and ability of a row unit to float or otherwise move in a substantially vertical direction will provide that the row unit maintains a substantially similar depth during the planting process. The maintaining of depth of the planting process increases the yield of an eventual crop by placing the seed at a desired depth within the soil, which may be based upon known or determined test results.

Therefore, the invention includes numerous aspects which pertain to the providing of down force at and to a row unit of an agricultural implement. As will be understood, the down force could be provided in many different ways, and also at different locations of the row unit to provide that the components of the row unit, e.g., the opener wheels, penetrate the ground to place a seed at a desired depth and to maintain that desired depth throughout a field, regardless of changing soil characteristics or obstructions in the field. For example, according to some aspects of the invention, a linear actuator is provided to provide the required down force to the row unit. The linear actuator can include a sensor or other foresight technology to provide information regarding an area of the field in front of the row unit, wherein the linear actuator is able to adjust the amount of down force prior to or at the location of a particular place in the field. This allows the row unit to preload or otherwise be ahead of a change in the composition of a field or of the presence of an obstruction in the field.

Still other aspects of the invention provide for different methods, apparatuses, and/or systems of attaching a row unit to a toolbar of an agricultural implement. These different ways of attaching the row unit to the toolbar can allow for different mechanisms to be utilized which will allow for a maintaining of down force on the row unit, while allowing the row unit to float or otherwise move in a vertical direction upon interaction with an obstruction. In some instances, the direct connection between the row unit and the toolbar will alleviate some of the required down force, as the down force providing mechanism can be actuated in a more vertical manner, as opposed to having both vertical and horizontal components. In addition, some of the aspects remove or otherwise readjust the weight of a row unit such that less down force is required to move the components of the row unit.

In any of the embodiments, the location of a down force provider can be positioned generally anywhere on the row unit. For example, and according to some aspects of the invention, it is contemplated that a down force provider or actuator be provided between the toolbar and the row unit.

In other aspects, the down force actuator can be provided at an opening and/or closing wheel of the row unit. And still other aspects, there may be multiple actuators located at multiple positions including some of said previously mentioned locations.

Still further, it is contemplated that the actuator be placed ahead of the toolbar such that the down force is determined ahead of the actual location of a furrow creating mechanism, such as an opening wheel or other mechanism.

According to some aspects of the invention, the introduction of a foresight technology may be included. The foresight technology can be technology that is used to view or otherwise sense an area ahead of an opening or furrow creating mechanism, row units, and/or gauge wheels of an agricultural implement. The foresight technology can determine the distance from a toolbar of the implement to the ground, which can aid in determining a system which provides for data at a set distance ahead of the opening mechanism. This foresight technology could be utilized to set a determined down force or alleviate a down force based upon information gained from said foresight technology. For example, if an obstruction is determined to be in a path of one or more row units, the information could be relayed to the row unit such that the row unit is able to float, move, or otherwise be displaced while mitigating damage to the row unit due to the obstruction. Immediately after the obstruction, the down force could be reactivated to provide that the row unit begins to create a furrow or other opening in the field at a predetermined depth. In addition, the foresight technology could also be utilized to determine a change in composition, such as the hardness or softness of soil, to adjust or preprogram the amounts of down force that will be required to place the seed at a predetermined and desired depth within said soil.

It is contemplated that in any of the embodiments, aspects, or otherwise versions of the down force providing mechanisms of the invention, numerous types of actuators or other mechanisms could be used. For example, linear actuators, pneumatic actuators, hydraulic actuators, mechanical actuators, active orientation systems, or other mechanisms may all be utilized to provide a down force and/or floating aspect to the row unit to provide that the row unit accomplishes its task. As will be understood, any of the variations could be utilized with any of the embodiments, and a combination of the variations could also be utilized at the same time.

BRIEF DESCRIPTION OF THE DRAWINGS

FIG. 25 is a diagram showing types of electric linear actuators and being operatively connected to compressed gas.

FIG. 26 is a diagram showing sensors connected to gauge wheels.

FIG. 27 is a diagram of sensor types.

Figure 1:
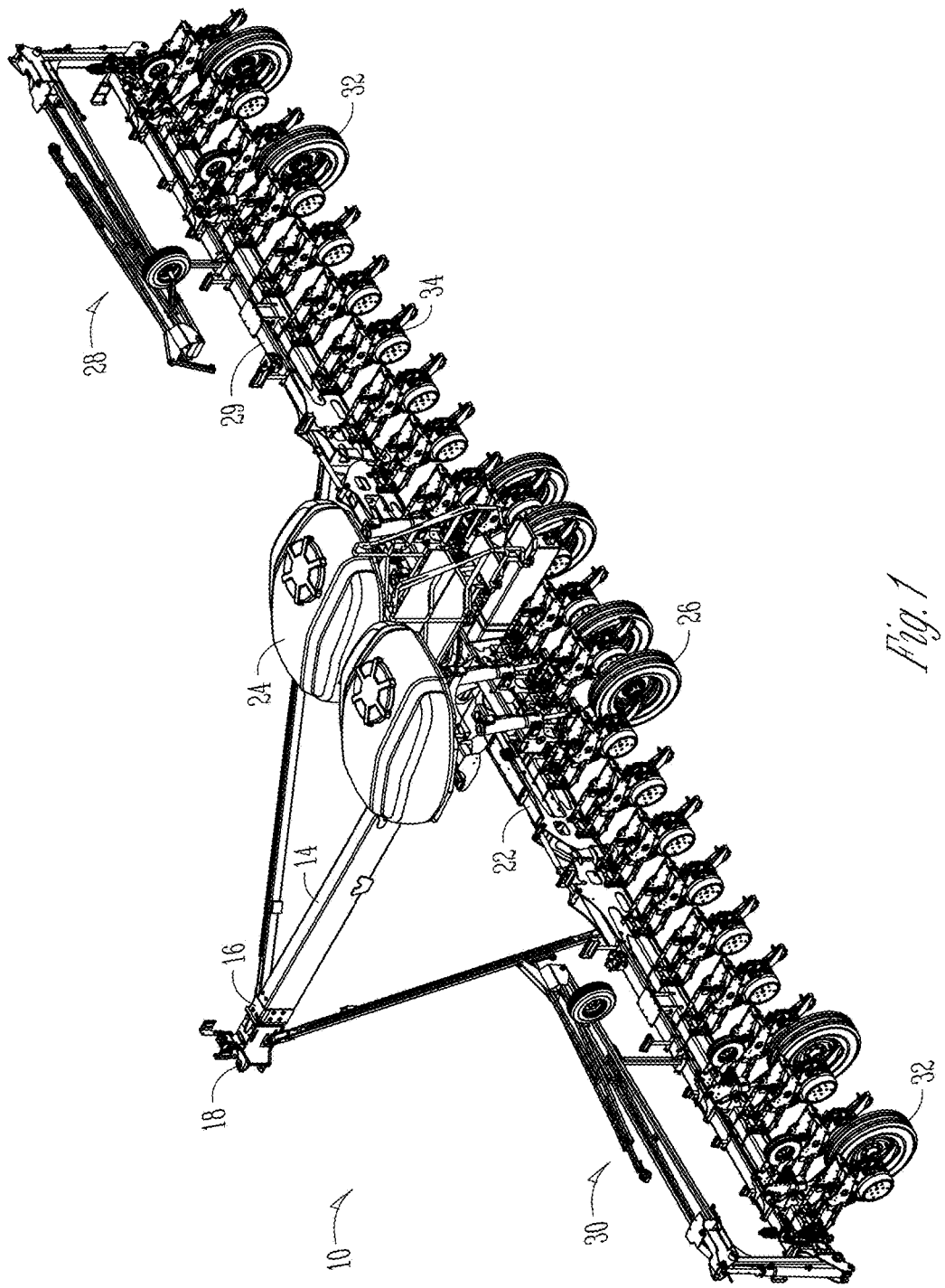
FIG. 1 is a perspective view of an agricultural planter.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 shows an agricultural implement 10, in this case, an agricultural planter. The planter 10 is usually attached to and pulled by a tractor. However, it should be appreciated that other equipment and/or vehicles may move the implement 10. For purposes of the present disclosure, the implement 10 will be referred to as a planter.

The planter 10 includes a tongue 14 having a first end 16 and an opposite second end (not shown). The tongue 14 includes a hitch 18 at the first end 16, with the hitch 18 being connected to the tractor. At the opposite end of the tongue 14 is a central toolbar 22. The tongue 14 may be a telescoping tongue with components capable of being inserted into one another such that the implement 10 is a front folding style implement. However, the present invention is not to be limited to such front folding style implements and is to include any such implement for use in the agricultural industry.

Figure 3:
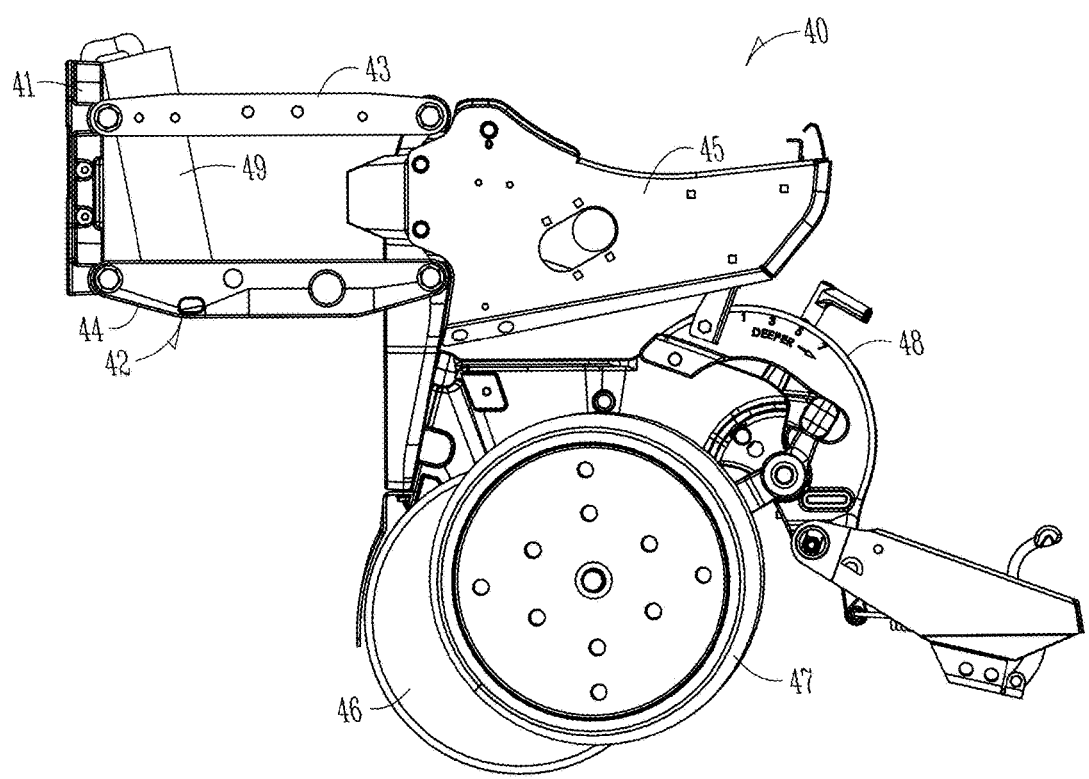
FIG. 3 is a side elevation view of the row unit of FIG. 2.

As shown in FIG. 1, central hoppers 24 are positioned at the central toolbar 22. The hoppers 24 are configured to store seed, fertilizer, insecticide, or other types of material for use in farming. The hoppers 24 may both contain the same material, or could contain separate materials. The use of the central hoppers 24 allows for a large amount of material to be added and stored at a centralized location. However, the invention also contemplates the use of one or more hoppers positioned at each of the row units 34 for providing seed to be planted at the row units, as is shown in FIG. 3. When central hoppers 24 are used at the central toolbar 22, it should be appreciated that the central hoppers will be in fluid communication with each of the row units 34. This can be done by use of separate hoses to each of the row units, or fewer hoses that include splitters, wherein the hose is split to provide seed or other material to more than one row unit. Also connected to the central toolbar is a plurality of central wheels, which may be known as transport wheels 26 extending generally downwardly from the central toolbar 22. The wheels 26 contact the ground and support the central hoppers 24. The wheels stabilize the implement 10 and are the wheels that contact the ground when in a working position or a transport position, e.g., if the implement 10 is a front folding implement such that the wings 28, 30 are folded forward with wing wheels 32 not contacting the ground.

Extending generally from both sides of the toolbar 22 are first and second wings 28, 30. The wings 28, 30 are generally identical and mirror images of one another. Therefore, only one wing will be described with the understanding that the other wing will be generally the same configuration. The first wing 28 includes a bar 29. Mounted to the bar 29 are a plurality of row units 34, as well as a plurality of wheels 32. The wheels 32 are configured to contact the ground. The row units 34 may be seeders, fertilizers, insecticide sprayers, or other dispensers, discs, or plows. The wings 28, 30 may also include at least one fold cylinder and a down force cylinder. It is further contemplated that multiple down force cylinders be used with an implement having more sections. The fold cylinder(s) is configured to fold the wings to a position wherein the first and second wings 28, 30 are generally adjacent the tongue 14 of the implement 10.

Figure 2:
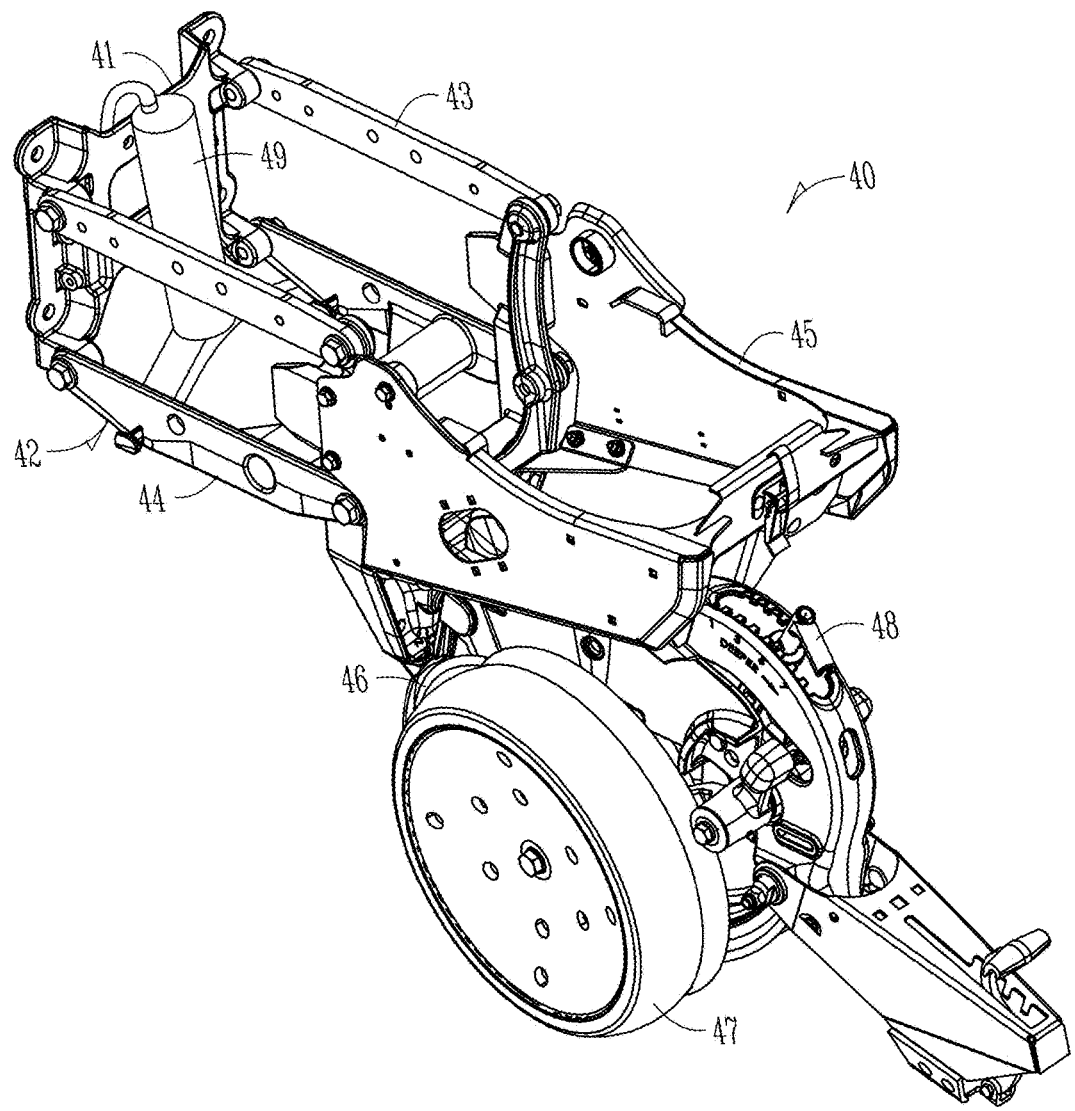
FIG. 2 is a perspective view of a row unit for use with an agricultural planter.

FIGS. 2 and 3 are views of a row unit 40 including aspects of the invention which utilize a linear actuator 49 for providing down force at the row unit 40. The row unit 40 can be one of a plurality of row units that can be positioned for use with a planter 10, such as that shown in FIG. 1. The row unit 40 shown in FIGS. 2 and 3 includes a mount 41 for attaching to a toolbar (not shown) of an agricultural implement, such as the agricultural planter 10 of FIG. 1. A linkage 42 extends generally between the mount 41 and the frame 45 of the row unit 40 to connect the row unit 40 to the toolbar. The linkage 42 is shown to be a four bar linkage including substantially parallel upper bars 43 and lower bars 44.

The frame 45 is therefore able to rotate and/or move in a generally vertical direction relative to the toolbar based upon the allowed movement of the linkage 42. Operatively attached to the frame 45 are opening wheels 46, gauge wheels 47, and a depth adjustment mechanism 48. Closing wheels (not shown) would also be included with many versions of the row unit 40. The opening wheels 46 create a furrow, trench, or other opening in the ground in which seed is deposited from a seed meter. The gauge wheels 47 and depth mechanism 48 work to set a depth of the opening created by the opening wheels 46 and are utilized to try to maintain said depth throughout the field. However, due to changing conditions of the field, and/or the presence of obstructions as the implement moves through the field, the gauge wheels may have made too much depth, not enough depth, or may encounter obstructions, which cause the row unit 40 to bounce in a substantially vertical direction. In such a situation, the row unit 40 may not go back to its original depth. Therefore, a down force providing mechanism, which is shown to be a linear actuator 49 in FIGS. 2 and 3, is provided. The linear actuator 49 can be an electric linear actuator, which can be used in place of a pneumatic down pressure bag, which is currently used in the agricultural industry. The linear actuator 49 provides down force for the row unit 40.

Power for the electric linear actuator 49 could be provided from the tractor or an electric power source mounted or otherwise connected to the agricultural planting implement. The linear actuator 49 could be set to be moved fast enough to maintain depth of the opening wheels 46, while allowing for give due to obstructions or other changes in the field. For example, the pressure could be maintained by the linear actuator 49, but could be alleviated upon a substantial upward force on the row unit 40. With such a situation, an actuator or rod of the linear actuator 49 can be allowed to retract within the housing of the linear actuator 49. However, the linear actuator 49 could be set to provide that as soon as the substantially upward forces pass, the rod can be re-extended to force the row unit via the linkages 42 to the desired depth, thus providing a substantial and desired down force pressure to the row unit 40.

The electric linear actuators 49 could be of the screw type, magnetic solenoids, electro-fluid (wherein the viscosity is changed upon a voltage change), and/or damping systems. Such systems will provide for a down force pressure, while allowing a rod or other extension member to be moved in and out at least partially within the housing of the linear actuator 49. Furthermore, the linear actuator 49 could be a solid state actuator, which comprises a memory metal. In such a situation, a magnetic force, heat, or other source (such as a compressible gas or other fluid) can be utilized to change the size of the cylinder as is needed throughout the movement of the row unit 40 and agricultural implement through the field.

Furthermore, sensors could be placed at the gauge wheels 47 to measure the pressure of the gauge wheels as they move through the field. This is known as the gauge wheels "walking". The walking of the gauge wheels will provide a measurement that can be utilized by the linear actuator 49 to provide a sufficient amount of down force pressure to the row unit 40 based upon said walking. Therefore, the linear actuator 49 can include fast actuators to consistently actuate based upon the changing measurements received by the linear actuator 49. It is to be appreciated that additional aspects are also contemplated by the invention.

Figure 4:
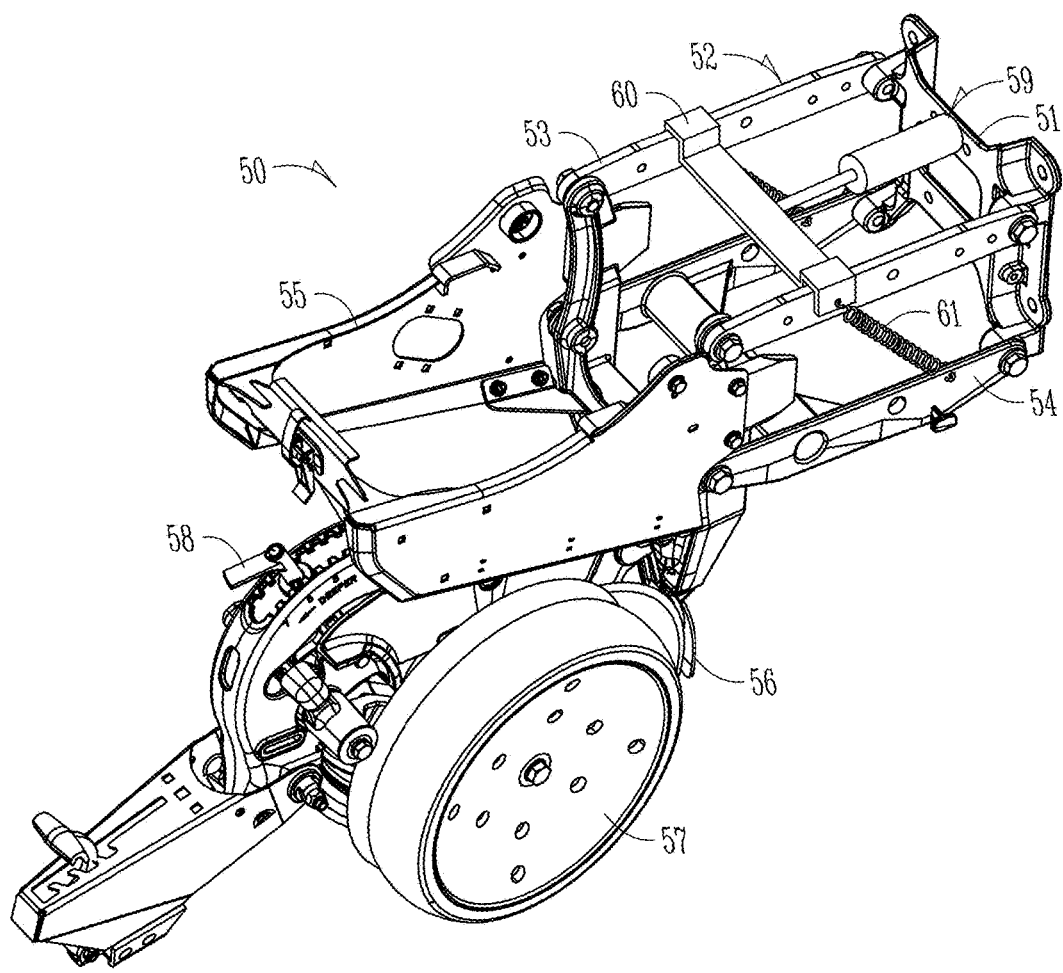
FIG. 4 is a perspective view of a row unit for use with an agricultural planter including additional aspects.
Figure 5:
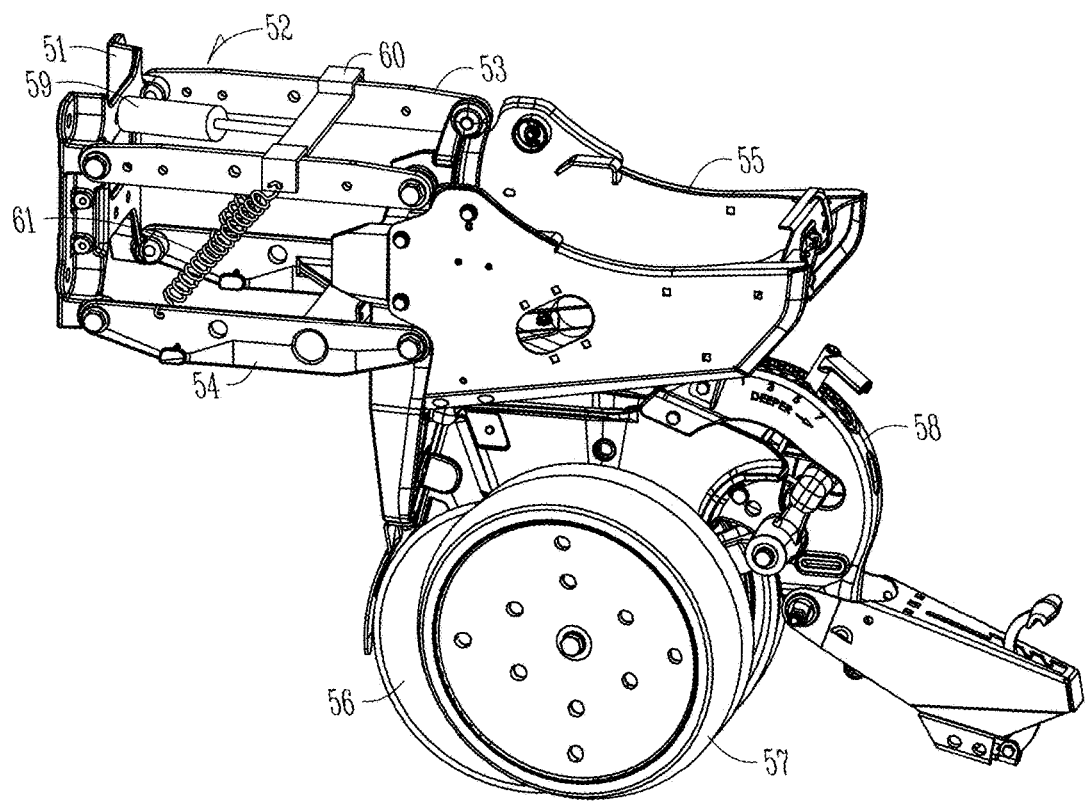
FIG. 5 is a side elevation view of the row unit of FIG. 4.

FIGS. 4 and 5 are views of a row unit 50 showing additional aspects of the invention. The row unit 50 shown in FIGS. 4 and 5 include many of the elements of the row unit 40. For example, the row unit 50 includes a mount 51, linkage 52 including substantially parallel upper bars 53 and lower bars 54, and a frame 55. Furthermore, the row unit 50 includes opening wheels 56 to create a furrow or trench in a field, gauge wheels 57 for aiding and maintain the depth of the opening wheels 56, and a depth mechanism 58 for adjusting the depth of the opening wheels 56 in the field via the gauge wheels 57. The row unit 50 would also likely include closing wheels to close a trench created by the opening wheels. The row unit 50 also includes an electric linear actuator 59 for providing down force pressure of the row unit 50. However, the row unit 50 shown in FIGS. 4 and 5 also includes a spring 61 for use with the electric linear actuator 59. The spring 61 and linear actuator 59 work together to provide a down force pressure of the row unit 50.

In the row unit 50 shown in FIGS. 4 and 5, the electric linear actuator 59 is operatively connected between the mount 51 and a sliding mechanism 60. The slide or sliding mechanism 60 is any mechanism capable of moving relative to the upper and/or lower bars 53, 54 of the linkage 52. As shown in the figures, the slide is positioned to move relative the upper bars 53 of the linkage 52. The slide moves based upon the actuation of the electric linear actuator 59, such as by the extension and retraction of the rod in and out of the housing of the linear actuator 59. Furthermore, the spring 61, which may actually include first and second springs attached between opposite ends of the slide 60 and opposite lower bars 54, can be compressed or decompressed based upon the movement of the linear actuator 59 and slide 60, in which case the spring can provide or reduce down force pressure for the row unit.

For example, the actuator 59 is positioned to be extended and retracted in a generally horizontal or substantially a horizontal direction. This moves the slide 60 about or parallel to the upper bars 53 of the linkage 52. In the particular embodiment shown, the slides "ride" on the upper linkage bars, but it is to be appreciated that the slide could otherwise move in relation to the row unit 50. When the slide moves in a rearward direction, i.e., towards the frame 55 of the row unit 50, the load on the spring or springs 61 is lessened, which provides less of a down force pressure on the row unit 50. However, when the linear actuator rod is retracted, and the slide 60 moved towards the mount 51, the spring 61 can be loaded, such that it provides a greater downward force on the linkage 52, which provides a greater down force pressure on the row unit 50. However, it should be noted that the springs and actuator can be set such that the opposite movement can load or lessen the force provided on the row unit 50. In addition, it should be appreciated that the linear actuator 59 can be reversed such that it extends between the frame and the slide 60, instead of between the mount 51 and the slide 60. The configuration shown in FIGS. 4 and 5 are for exemplary purposes only, and the combination of a linear actuator and a mechanical actuator, such as a spring or plurality of springs, can be configured in any manner to provide down force pressure to the row unit 50, while also providing a mechanism that allows the row unit to float or otherwise move in a vertical direction upon interaction with an obstruction.

For example, while the spring 61 provides down force pressure for the row unit 50, the spring can also be compressed, such as when the row unit hits an obstruction and the components are thrust in a vertical manner. The spring is a substantially non-rigid member that will allow for some float of the row unit, while also providing that the down force pressure will be re-exerted once the obstruction is passed.

Similar to the row unit 40, the components of the row unit 50 provide down force pressure for the row unit 50 such that the depth of the furrow or trench is maintained to provide the depositing of seeds in the depth of a predetermined range, which may be desired for planting a particular type of seed. Therefore, the linear actuator can be generally any sort of electric linear actuator, such as a screw type, magnetic solenoid, electro-fluid, damping system, and/or solid state actuator. In addition, the spring or springs 61 can be generally any spring or springs which are capable of providing and lessening a downward force on a row unit. The choice in size of spring can be determined based upon the particular weight of a row unit. Furthermore, the combination of the linear actuator 59 and springs 61 can work with sensors on the gauge wheels or other portions of the row unit 50 in order to provide and maintain a down force pressure on the row unit to maintain the depth of the trench, regardless of changing field conditions, and/or obstructions in the path of the agricultural implement and/or row units.

Figure 6:
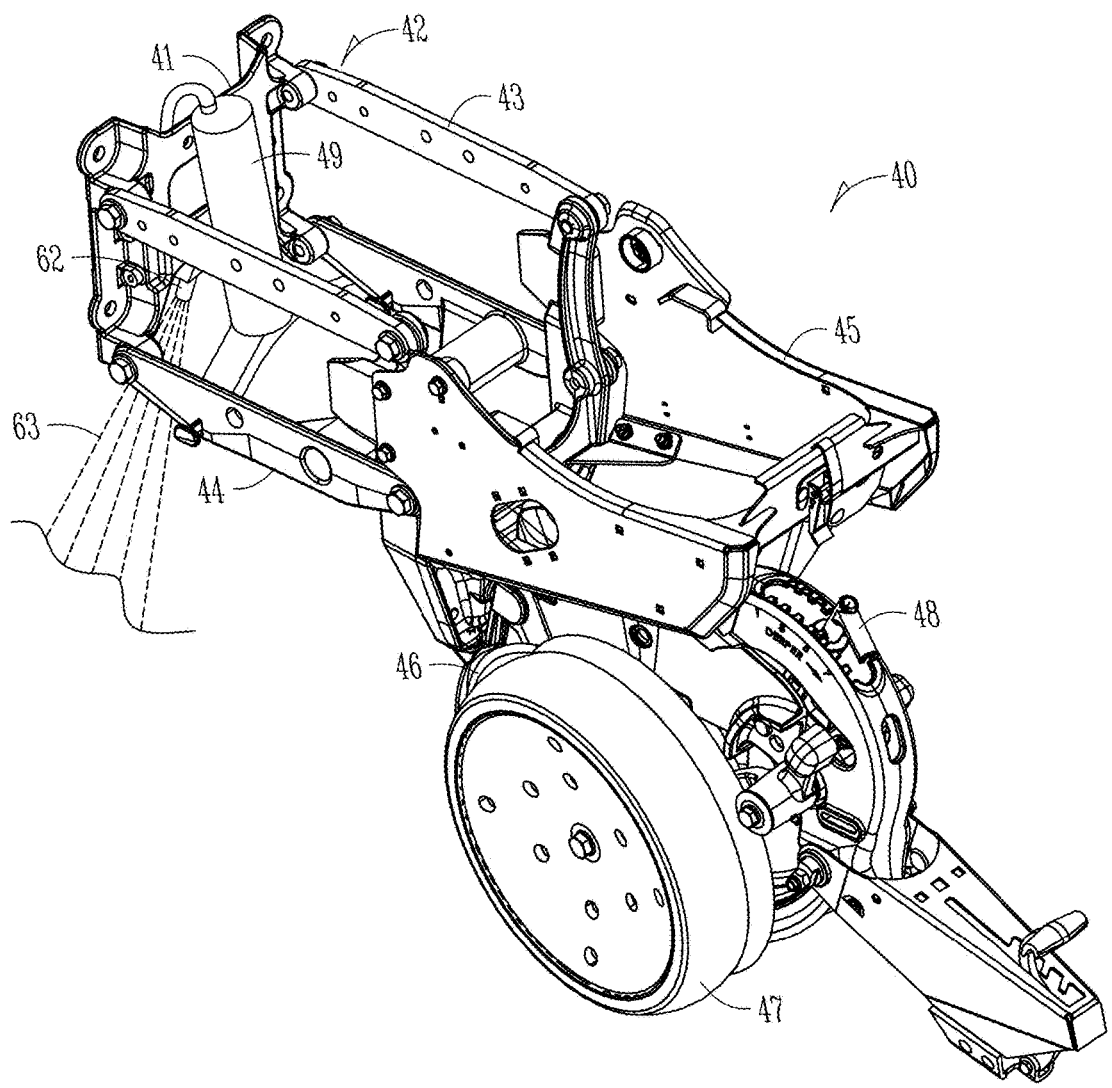
FIG. 6 is a perspective view of a row unit for use with an agricultural planter showing additional aspects.
Figure 7:
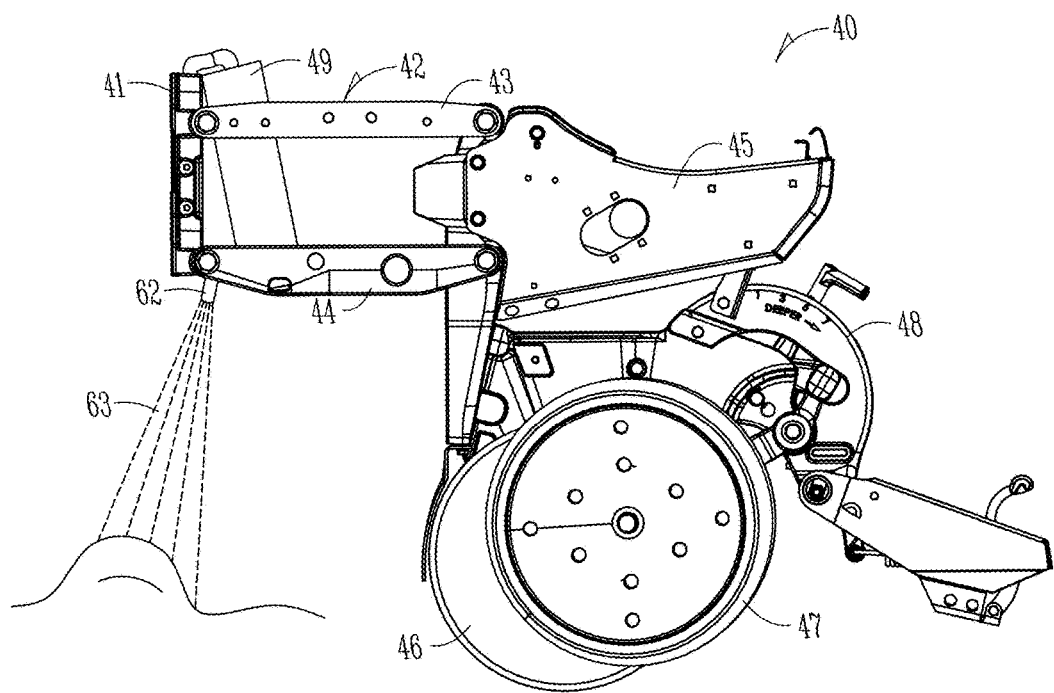
FIG. 7 is a side elevation view of the row unit of FIG. 6.

FIGS. 6 and 7 show additional aspects of the row unit 40 incorporating a linear actuator 49 to provide down force pressure for the row unit 40. While the additional aspects will be directed towards the row unit 40, it should be appreciated that the same or similar components as will be mentioned can be utilized with the row unit 50 of FIGS. 4 and 5 as well. In addition to the linear actuator 49 of the row unit 40, the embodiment shown in FIGS. 6 and 7 include one or more sensors 62 operably connected to the row unit 40. As shown in the figures, the sensor 62 is operatively connected to the linkage 42, the mount 41, or some other portion of the row unit 40. It is also to be contemplated that the sensor could be placed on or at a toolbar (not shown), to which the row unit 40 is attached. The sensor 62 provides a monitoring system for monitoring the ground in front of or adjacent the row unit 40 to "read" the ground to prepare depth of the units ahead of time. Thus, the sensor may be any sort of sensor, including but not limited to a soil characteristic sensor, visual sensor, temperature sensor, distance or other vision sensor, or generally any other sort of sensor which is capable of determining a change in a ground condition in front of or adjacent the row unit. The sensor 62 provides a viewing area 63, which is positioned to "view" a known distance between the viewing area 63 and the opening wheel 46.

The sensor 62 can be operated along with the down force providing mechanism, e.g., the linear actuator alone or the linear actuator in spring combination, to pre-adjust or otherwise prepare the down force pressure of the row unit based upon real time or historical data acquired by or stored in the sensor 62. For example, when the sensor 62 determines a change in the soil composition within the viewing area 63, the sensor can interact via an intelligent control or control unit to actuate the linear actuator 49 accordingly. For example, if the sensor 62 determines a softening of the ground ahead of the opening wheel 46, at a known and/or predetermined distance, the sensor can work with the system to actuate the linear actuator 49 to lessen the down pressure force of the row unit. As the ground will be softer, less down force is needed to penetrate the ground at the predetermined depth. However, if the ground is determined to be harder at the known distance, the linear actuator 49 can be activated to provide more down force pressure to penetrate the ground with a harder force to obtain a trench of a selected depth. In addition, if the sensor 62 were to determine an obstruction, such as a rock, dirt clod, field trash, or the like, the actuator can be alerted to temporarily disable any down force pressure. Such disabling of the linear actuator will allow the row unit to temporarily float and/or move in an upward direction. Upon passing of the obstruction, the linear actuator 49 can be activated to provide the desired down force pressure to be able to create the trench and/or furrow in the ground. At the same time, the down force can be maintained even during the float of the row unit, such that the row unit will revert to its original position after passing the obstruction.

Thus, the use of a sensor 62 with either of the row units 40, 50 will provide many benefits and/or advantages, such as a preloading or setting for the down force providing mechanism. Such use of a sensor can aid in mitigating the amount of damage based upon the rigidity of a row unit upon interaction with an obstruction. Furthermore, the knowledge of a change in soil condition prior to a trench opening device reaching said change in the soil condition, and thus the change in the amount of down force pressure that can or should be provided, can aid in maintaining a desired furrow depth for placing the seed within an acceptable depth range for planting. For example, the sensors could test the ground conditions and relay them to the down force provider and/or could use historical data from a system or other implement to pre-plot or map the field with soil conditions and use to adjust the down force provider. The sensor could be a memory database and/or communicator. When the sensor is a database, the sensor can obtain and store information related to the soil conditions of a field. For example, a field may include a section of soil that may be notoriously dry in certain areas, which would necessitate a higher down force pressure. This could be stored in the sensor, such that in the following year, the sensor will relay this information to the down force provider to automatically provide the additional down force at said location. Furthermore, the invention contemplates that another vehicle travels ahead of the agricultural planter to determine and plot soil characteristics throughout a field. This lead apparatus could then relay the information wirelessly and/or wired to the sensor 62. For example, the two or more vehicles could be in a field at the same time, such that the planter consistently receives information in real time about the rest of a field. In contrast, a farmer could "scout" a field with sensors, store the information, and then later upload the information into the system controlling the down force providing members of the planter for use during the planting. The information could then be used to adjust the amount of down force pressure provided by the down force pressure provider at the specific locations as the implement moves through the field. Thus, the system could be an open loop (real time information used to continuously update) or closed loop (farmer sets a particular depth and this is maintained regardless of the information received). Still other benefits obvious to those skilled in the art are to be considered part of the invention.

Additional aspects of the invention include a different configuration for the actuator 49 for providing the down force pressure for the row unit 40. It is contemplated that a linear actuator could be used over a compressed gas. The gas would work as a damper to absorb shock loads of the row unit and acted on the linear actuator 49. This could help to reduce field noise by utilizing the compressed gas to allow the rod of the linear actuator to be moved upon a shock load, while moving the rod back to the preferred position after the load has passed. This will aid in maintaining an amount of down force acting on the row unit as the implement moves through the field, and also accounts for some obstructions or changes in the field.

Figure 8:
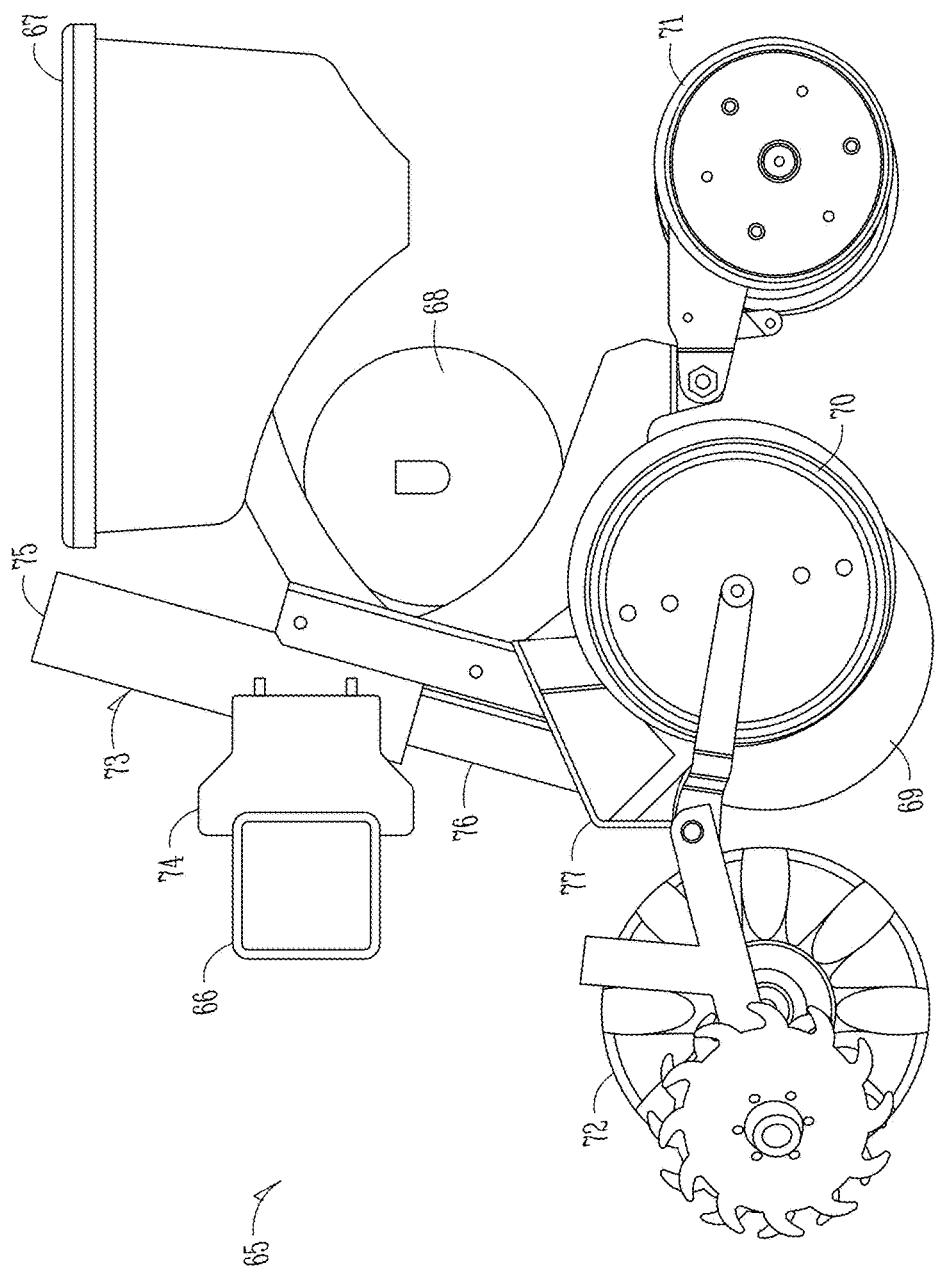
FIG. 8 is a side elevation view of a row unit for use with an agricultural planter showing additional aspects.

FIGS. 8-11 are additional embodiments of row units that provide additional ways of providing a down force pressure for the said row units. For example, FIG. 8 is a row unit 65 in which the row unit is attached to the toolbar 66 without the use of a four bar linkage. Instead, the row unit 65 is directly or otherwise operatively attached to the toolbar 66 via a connector 74 with the use of a strut 73. Additional aspects of the row unit 65 include a hopper 67, seed meter 68, opening wheel 69, gauge wheel 70, closing wheel 71 and trash wheel 72, which may also be known as a leader wheel. The row unit 65 may also include a frame 77 for aiding and attaching the components to one another.

As mentioned, the row unit 65 includes a strut 73 that attaches the row unit 65 to the toolbar 66. The strut 73 may be a down force providing mechanism that is actuated by air, hydraulic fluid, mechanical pressure (spring), compressible fluid, or some combination thereof to provide the needed down force and vertical travel of the row unit. For example, as shown in FIG. 8, the strut 73 is an actuator including a housing 75 and an actuator rod 76 extending and retracting relative the housing 75. Certain components of the row unit 65 will maintain a substantially rigid configuration, while other components will be fluid. The housing 75 of the strut 73 is connected to the toolbar 66 via the connector 74. Furthermore, the hopper 67 and seed meter 68 are operably connected to the strut housing 75. These components will be substantially rigid and will not move or need to be moved in a vertical direction, and may be referred to as fluid components. However, according to some aspects of the invention, other combinations of the components can be substantially rigid, movable, or somewhere in between. For example, components such as the hopper, seed meter and closing wheels could be rigidly mounted to the toolbar or moving with the opener disks or in any combination.

The frame 77 and components attached thereto, which include, but are not limited to, the opening wheel 69, gauge wheel 70, and trash wheel 72, may be attached to the actuator rod 76 of the strut 73, and may be known as fluid components. Therefore, in such configurations, movement of the actuator 76 relative to the housing 75 of the strut 73 will also cause movement of those components. Therefore, the strut 73 can provide a down force pressure via the actuator 76 to the trash wheel 72, opening wheel 69, and gauge wheel 70, which are the components that most need to be maintained with a desired amount of down force pressure during transport of the row unit 65. In addition, the strut 73 would allow these fluid components to move in a vertical direction upon interaction with an obstruction, which would provide a floating type movement for the system. The frame 77 could also be attached to a slide or other guide member, which can aid in controlling the movement of the fluid components such that they will move in a substantially vertical direction, while not rotating about the strut 73. It should be again noted that, while certain components have been designated as being rigidly and/or fluidly connected, any of the components or any combination of the components could be connected in either manner (i.e., rigidly or fluidly).

Advantages to such a system will provide a situation in which the seed released from the seed meter 68 does not pass through a tube which will move very much. Thus, this will reduce the bounce of the seeds as they travel towards the trench, which will increase meter efficiency and will increase the efficiency of the desired spacing between the seeds. In such a situation, the substantially rigid components of the row units 65 will not be influenced by changing soil types, obstructions, or other things in a field, as they will be maintained as though nothing is changing. For example, while the fluid components will "bounce" or "float", the rigid components will act as if there were no vertical change. The fluid components connected to the strut mechanism 73 will be the moving components which move in a substantially vertical direction up and down, while the substantially rigid components can be maintained in a relatively constant manner.

Figure 9:
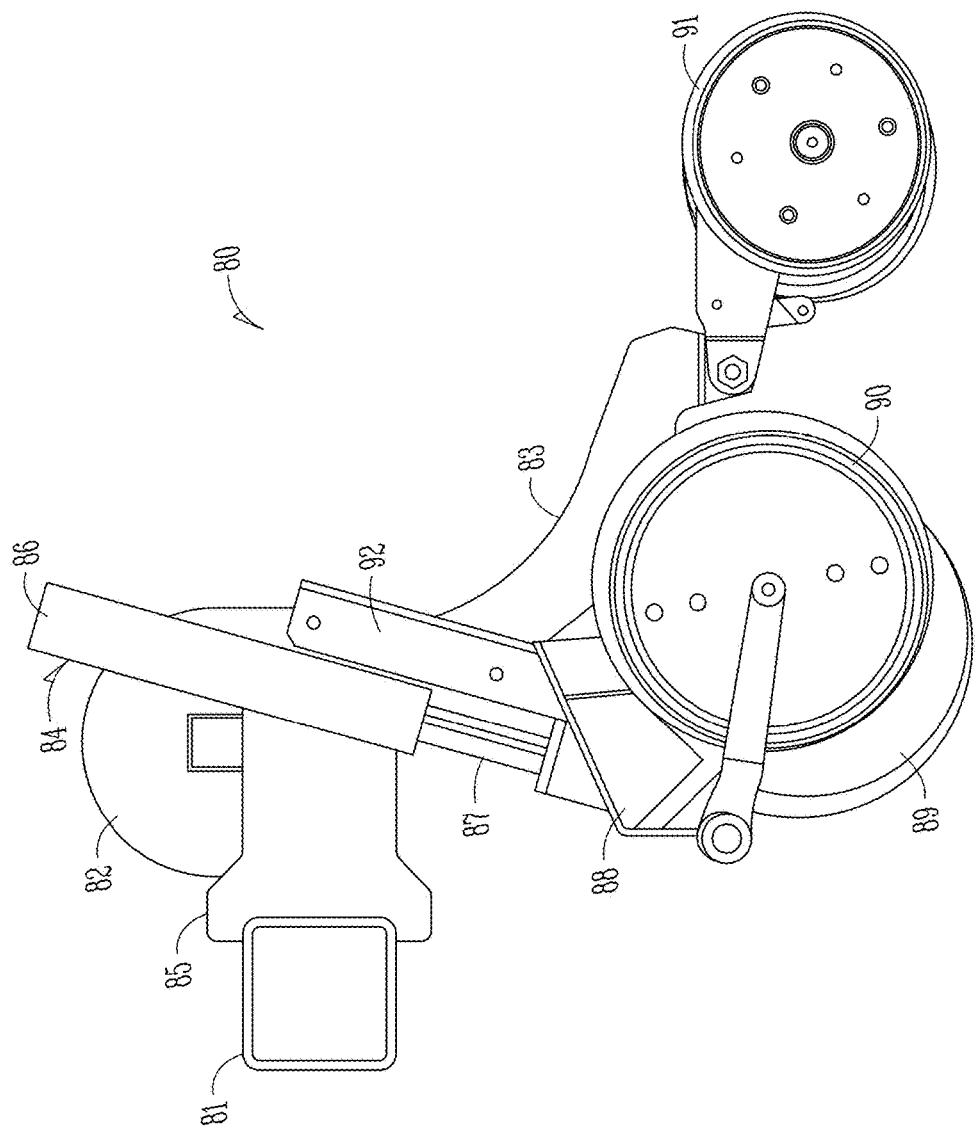
FIG. 9 is a side elevation view of a row unit for use with an agricultural planter showing additional aspects.

FIG. 9 is a side view of a row unit 80 showing additional aspects of the invention. The row unit 80 includes a portion of a toolbar 81 of an agricultural implement. The row unit 80 is attached to the toolbar 81 via a connector 85, which is positioned between the toolbar 81 and a strut 84. In the embodiment shown in FIG. 9, the seed meter 82 of the row unit 80 is connected either directly to the toolbar 81 or is otherwise remote from the rest of the components of the row unit 80. The seed meter 82 also includes a seed tube 83 extending therefrom for passing the seed from the seed meter 82 and adjacent the opening trench in the ground. The strut 84 is connected to the connector 85 and includes a housing 86, which is connected to said connector 85. The strut 84 also includes an actuator rod 87 moveable relative to the housing 86, as the actuator 87 can be extended from or retracted with said housing 86. A distal end of the actuator 87 is connected to a frame 88 of the row unit 80. Operatively connected to the frame 88 are the opening wheels 89 and the gauge wheels 90. As shown in FIG. 9, the closing wheels 91 are operatively connected to the seed tube 83, and thus are part of the rigid components. As can be understood, the configuration shown in FIG. 9 provides that the seed meter 82, seed tube 83, and closing wheels 91 are attached to the toolbar 81 such that they are substantially rigid with regard to the movement of the components. In other words, the components will not substantially move upon external forces acting thereon.

The frame 88 of the row unit 80 is also operatively connected to a slide member 92 for guiding the frame 88 and attached components thereto as they float. The strut 84 is configured to provide a down force pressure for the fluid components of the row unit 80, which comprise the frame 88, opening wheels 89, and gauge wheels 90. Thus, the fluid components of the row unit 80 are able to move relative to the rigid components of the row unit 80. The actuator portion 87 of the strut 84 can provide a down force pressure to the fluid components of the row unit 80 to aid in maintaining a depth of trench or furrow created by the opening wheels 89. The gauge wheels 90 can aid in setting the desired depth thereof. An advantage of such a situation is that there is less weight in the rigid components that need the down force pressure, and thus, less down force pressure is required. This would allow for a lighter load down force providing mechanism (e.g., electrical linear actuator) to be used.

The strut 84, which can actuated by air, hydraulic fluid, mechanical actuation (spring), compressible fluid, or some combination thereof, provides for both the down force pressure and the floating capabilities of the row unit 80. In other words, the fluid components of the row unit 80 are able slide or otherwise move relative to the toolbar 81 as the actuator moves the fluid components along the slide based upon a sensed or otherwise determined distance between a sensor of the row unit 80 and the field. As a sensor determines that additional down force is required, the actuator member 87 of the strut 84 will extend to provide more force thereon. However, if an obstruction or other item is in the way of the row unit 80, the strut 84 will react to allow the actuator 87 to retract at least partially within the housing 86 of the strut 84, at least temporarily. The strut 84 can then reposition the components at the ground with the required down force. The movement of the actuator 87 in either a downward or upward direction will cause the frame 88 and components attached thereto to move substantially in tandem. Such movement can be facilitated by the frame being positioned adjacent the slide member 92. The slide can be positioned on opposite sides thereof to aid in the movement of the frame 88 and fluid components of the row unit 80, while also providing some stability such that the components will not rotate, and will instead move in a generally vertical direction.

Other components that may be included with the row unit 80 of FIG. 9 may include, but are not limited to, a sensor or other foresight technology, a database member, or other communicator. Such components may provide either real time or stored data for the row unit to alert the strut 84 of upcoming conditions such that the strut can adjust the down force pressure and/or floating of the fluid components accordingly. It should be acknowledged that, as there are fewer fluid components in the row unit 80 of FIG. 9, there will be less force required by the strut to move the fluid components in either direction.

Figure 10:
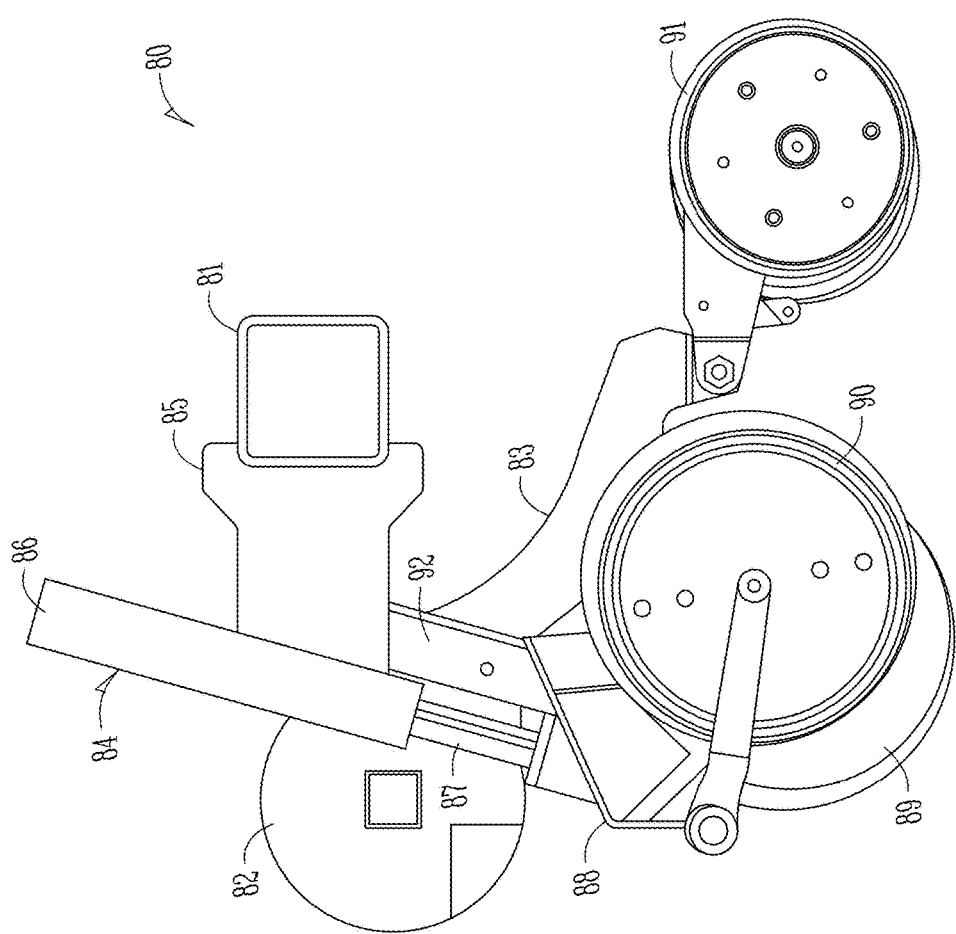
FIG. 10 is a side elevation view of a row unit for use with an agricultural planter showing additional aspects.

FIG. 10 is a side elevation view of a row unit 80 including additional aspects of the invention. The row unit 80 of FIG. 10 is similar to that of the row unit shown in FIG. 9. However, the orientation of the row unit 80 of FIG. 10 has been reconfigured such that the row unit is positioned on the front side of the toolbar 81. The seed meter 82 of the row unit 80 is positioned generally ahead of the toolbar 81 and includes a seed tube 83 extending rearwardly to allow seed to be directed rearward of the opening wheels 89 and gauge wheels 90 to place the seed in the trench at said location. In addition, the seed meter 82, seed tube 83, and closing wheels 91 may be connected directly to the toolbar 81, such that they are substantially rigid members or components or they may be attached to the frame 88 of the row unit 80 to become part of the fluid components of the row unit 80. In either situation, a strut mechanism 84 comprising a housing 86 and an actuator rod 87 housed at least partially therein and capable of extending from or retracting within is connected to the toolbar 81 via a connector 85. The actuator 87 is also connected to a frame 88, which may be riding on a slide member 92 of the row unit 80. Also connected to the frame 88 are openings wheels 89 and gauge wheels 90. The row unit 80 of FIG. 10 works substantially similar to that of the row unit in FIG. 9 in that the actuator 87 extends or withdraws relative to the housing 86 of the strut 84 in order to adjust the down force pressure of the fluid components of the row unit 80.

However, as most of the components of the row unit 80 are positioned ahead of the toolbar 81, the amount of down force pressure and the ability to detect down force, such as with foresight technology, may be configured differently than that of previous embodiments. In addition, the positioning of the components of the row unit 80 in FIG. 10 may allow different amounts of down force pressure to be utilized by the strut 84, as the components will not be behind said row unit, but will be able to use leverage based upon their location in front of the toolbar 81.

Other aspects similar to the row unit 80, including types of strut, and types of sensors, databases, communicators, and other foresight technology are to be included and considered part of the configuration shown and described with regard to FIG. 10.

Figure 11:
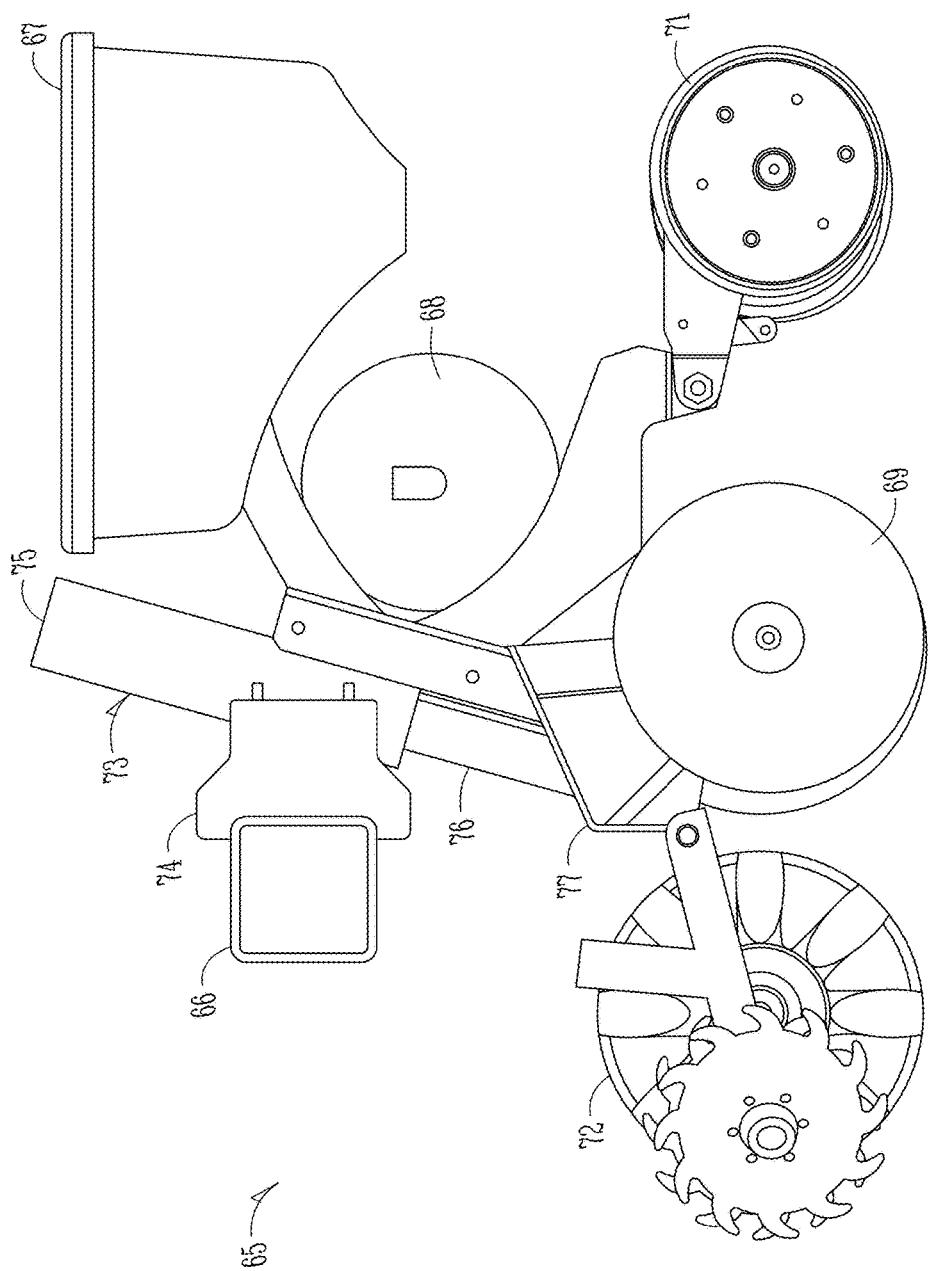
FIG. 11 is a side elevation view of a row unit for use with an agricultural planter showing additional aspects.

FIG. 11 is a side elevation view of another configuration of a row unit 65, which removes the need for gauge wheels for use with the row unit 65 to aid in maintaining the depth of the opening wheel 69. The configuration shown in FIG. 11 removes said gauge wheels and otherwise remains or keeps many of the components of the row unit 65 as that shown in FIG. 8. However, instead of maintaining control of the strut 73 with the use of the gauge wheel and any sensor attached thereto, a vision sensor, distance sensor, or other type of sensor is utilized to determine the depth created by the opener wheel 69. Such a sensor may be positioned at the axle of the opening wheels, or directly behind the wheels, positioned ahead of or oriented behind, or in any other configuration in which the sensor is able to determine a depth of furrow or trench created by the opener wheels 69. The data collected by said sensor can then be communicated to the strut 73 in order to adjust said the down force pressure provided by said strut 73. For example, it may be determined that the actuator 76 of the strut 73 may be extended to provide a more down pressure for the opener wheel 69 to create a deeper trench. In addition, when the soil characteristics change and a too deep of trench is created, the sensor can communicate the same to the strut 73 to retract or otherwise adjust the strut to reduce the amount of down force pressure provided by the strut 73, which can reduce the depth of the trench created by the opener wheel 69.

Furthermore, the trash wheel 72 may include sensors or other data collecting devices on or adjacent said trash wheel 72 in order to obtain information which can be directed or communicated to the strut 73 to adjust the down force, as needed. For example, as the trash wheel 72 is positioned generally ahead of the opener wheel 69 with regard to the direction of travel of the implement and row unit 65, the trash wheel 72 will experience the ground characteristics and any obstructions thereon of the field. Data, such as soil characteristics, obstructions, elevation change such as holes, or other conditions which may affect the ability of the row unit to create and maintain a trench of a predetermined and desired depth may be collected by the trash wheel 72 as it passes. This information can then be communicated wireless or in a wire manner to the strut 73 in order to adjust the down force and floatability of the strut before or when the opener wheel 69 gets to the location of a change in soil condition or location of an obstruction. Therefore, the row unit 65 can be an open loop system in which the data is continuously collected and the amount of down force is continuously updated per the conditions of a field being planted. However, it should also be appreciated that the system can be a closed loop system in which a desired amount of down force pressure is provided, and the strut 73 is automatically adjusted to maintain said amount of down pressure based upon a farmer's input.

As noted, in any of the configurations shown in FIGS. 8-11, any combination of the components could be rigidly or fluidly connected to the toolbar and/or each other, and the specific configurations noted should not be limiting on the configurations. For example, while the seed meter has been described as a component rigidly connected to the toolbar, in some configurations, it will be operatively connected to one or more of the fluidly connected components, wherein it is able to move with the actuating device. In some instances, for example, all of the components or none of the components can be fluidly connected to the toolbar such that they are able to be manipulated by the actuating device or allowed to float. In other configurations, only some of the components are fluidly connected, while others are rigidly connected. The invention should be understood to include any and all such combinations.

Figure 12:
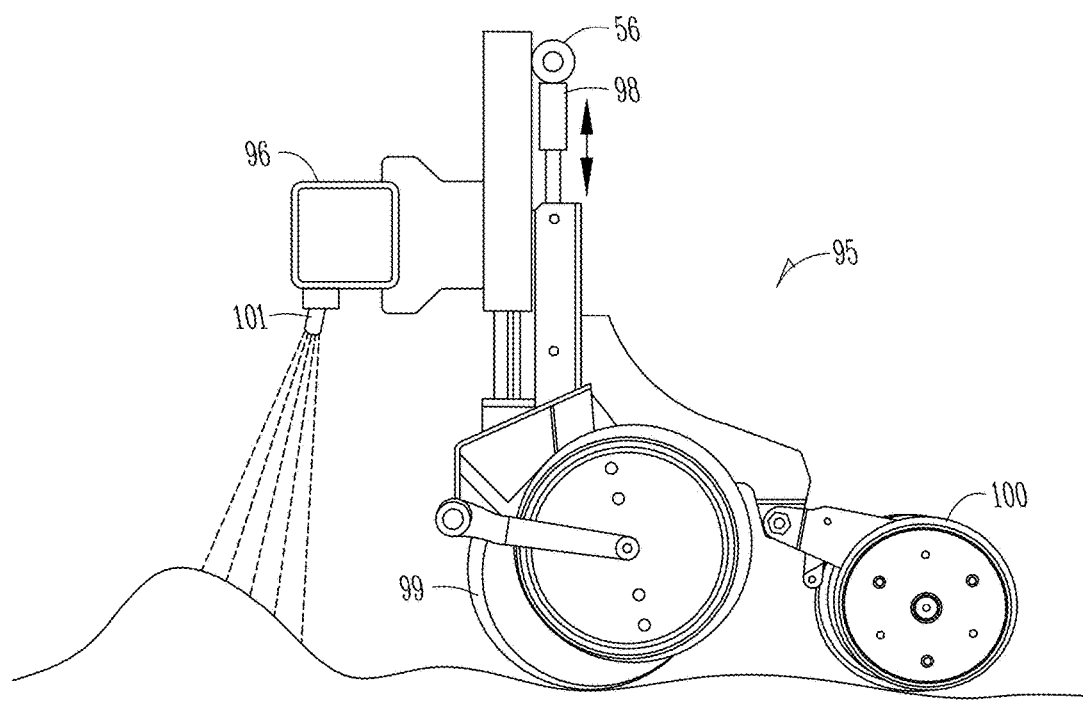
FIG. 12 is a side elevation view of a row unit for use with an agricultural planter showing additional aspects.

FIG. 12 shows an example of a row unit 95 connected to a toolbar 96 without the use of a four bar linkage and including a foresight technology in the form of a ground sensor 101 positioned on the front side of the toolbar 96. The row unit 95 shown in FIG. 12 includes a linear slide connected to the toolbar 96 and also connected to a linear actuator 98, which is connected to the row unit 95. The linear slide includes a mechanism that can be attached to the toolbar, while also including at least a component that is moveable relative to a rigid portion of the said slide 97. Thus, the rigid portion may be a housing of the linear actuator 98, wherein the actuator rod component of the actuator is connected to the rest of the components of the row unit 95, includes the opening wheels 99 and the closing wheels 100.

The sensor can be a foresight technology, which is used to view ahead of the opening wheels and other components of the row unit. It can be positioned on a follower wheel of a fertilizer opener, a leader wheel ahead of a culture wheel or gauge wheel, or even positioned on a sensor when no leader or other wheel is used with a row unit. The sensor can eliminate gauge wheels by determining a distance from the ground of each unit, i.e., the distance between the ground and the toolbar ahead of the opener wheel. The known distance can be included in any system, based upon speed of travel, to calculate the time between the sensed condition and the opening mechanism reaching said sensed condition location. Examples of types of sensors which can be utilized include, but are not limited to, laser, radar, temperature, moisture content, distance, soil type, nutrients, compaction, and the like. Other sensors are intended to be included, such as vision sensors and laser distance sensors. Furthermore, the sensor may be a GPS or other mapping member, in which a field can be mapped ahead of time such that the ground conditions and location of obstructions may be known prior to the planting with the row unit 95. When such a sensor is utilized, the map of the data base in the said sensor will determine its location and will utilize known or historical data related to the soil content or compaction of said soil to adjust the down force pressure of the row unit accordingly.

For example, when the foresight technology of the ground sensor 101 determines that a change in the height of one or more row units should be made, it can communicate to the linear actuator 98 of said row unit 95. The actuator, which is connected to the linear slide 97, can extend, retract, make rigid, or make more fluid the interior of said linear actuator 98 in order to provide for a change of height of the row unit(s). For example, when the actuator is made more fluid, this will allow for the row unit 95 to have more flow with regards to the toolbar 96. Making it rigid will provide so that there is little to no movement of the row unit 95. In addition, a movement of the linear actuator will adjust the height of the row unit provided by the actuator to the row unit 95. It should also be appreciated that, while a linear actuator 98 is shown and described with regard to the row unit 95 of FIG. 12, other types of actuators, included but not limited to, hydraulic, pneumatic, and the like may be included or used alone or in combination with one another.

Figure 13:
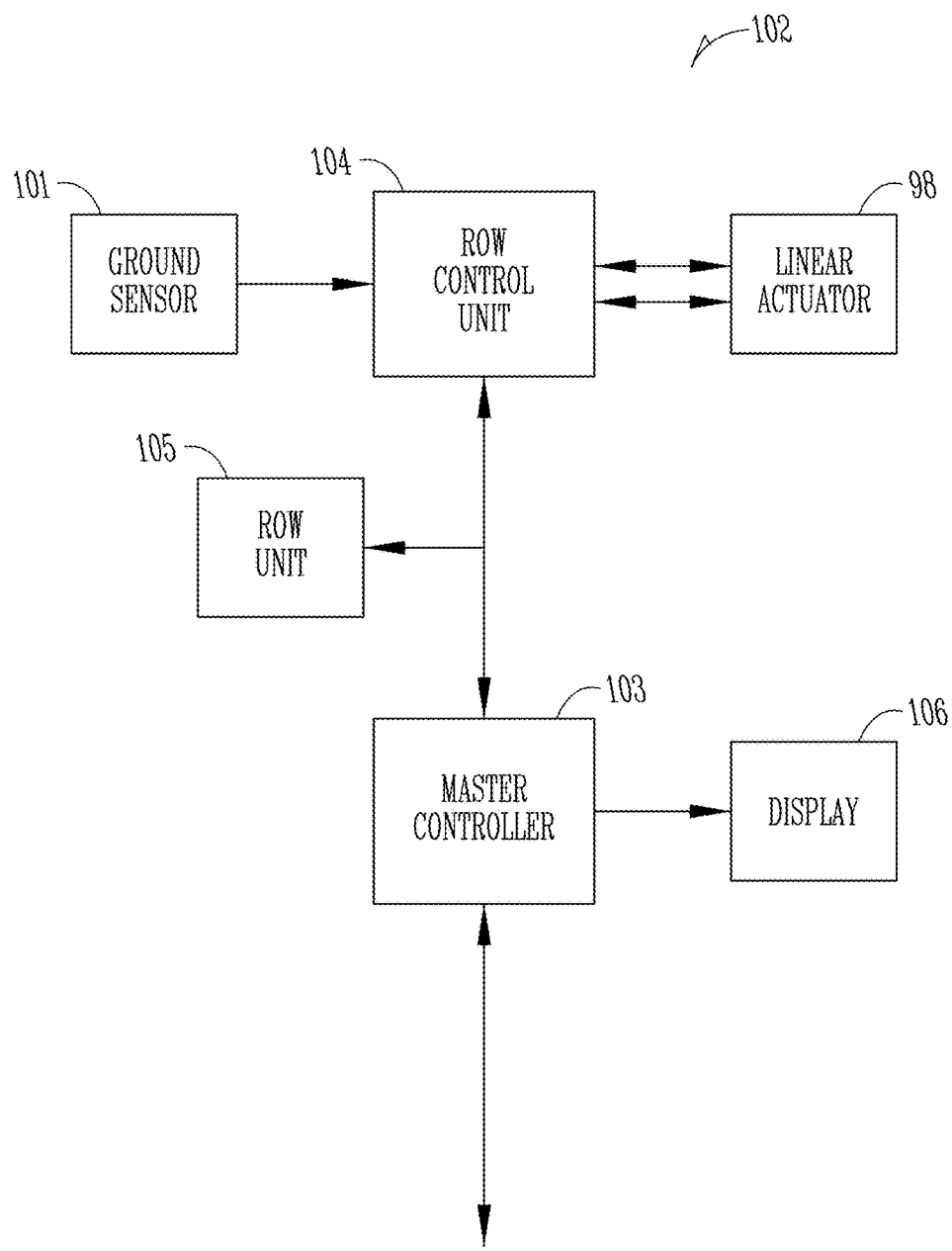
FIG. 13 is a schematic view of a block diagram showing components of the row unit of FIG. 12.

FIG. 13 is a schematic view of a block diagram showing components of the down force pressure system of the row unit 95 of FIG. 12. As shown in the schematic of FIG. 13, the system 102 includes the ground sensor 101, which has shown to be positioned on the front side of the toolbar 96. The sensor 101 is connected to a row control unit 104, which is the control unit or the dedicated row unit of the implement. This row control unit 104 is also connected to the linear actuator 98. The row control unit 104 is also connected to a master controller 103, which may also be known as an intelligent control for the entire agricultural implement. Thus, as shown by the box 105, each row unit, which is designated by row "n+1", of the implement is connected to the master controller 103 for the implement. Furthermore, a display 106 is connected to the master controller 103. The display 106 may be a display in a cab of a tractor pulling said implement, or may be a wireless display such as a tablet, phone, computer, or other computing device, in which a person is able to view the data related to the down force pressure for an individual row unit or all of the row units of a particular implement.

In operation, the ground sensor 101 determines the configuration of the field, or the location and field configuration based on historical data. This includes the level of the ground in front of the tool bar. This information is sent to the row control unit 104. The master controller, which may receive an input from the display or other user interface, selects and sets a desired down force pressure and/or trench depth for a planter. The row control unit uses the information from the sensor along with the preset information coming from the master controller 103 to determine if a change of the linear actuator 98 is needed. For example, the ground sensor will determine the distance between the sensor and the ground in front of the tool bar and then just adjust the height. Thus, the row control unit 104 can send an instruction to the linear actuator 98 to adjust the depth of the row unit and the height of one or more row units in order to account for said change in the elevation and/or landscape of the field. The system 102, which can be an open loop system or a closed loop system, can be continually updated at each of the row units to maintain or change itself to provide desired row unit height to maintain a trench or furrow within an allotted range in order to deposit seed within a desired range of depth.

Figure 14:
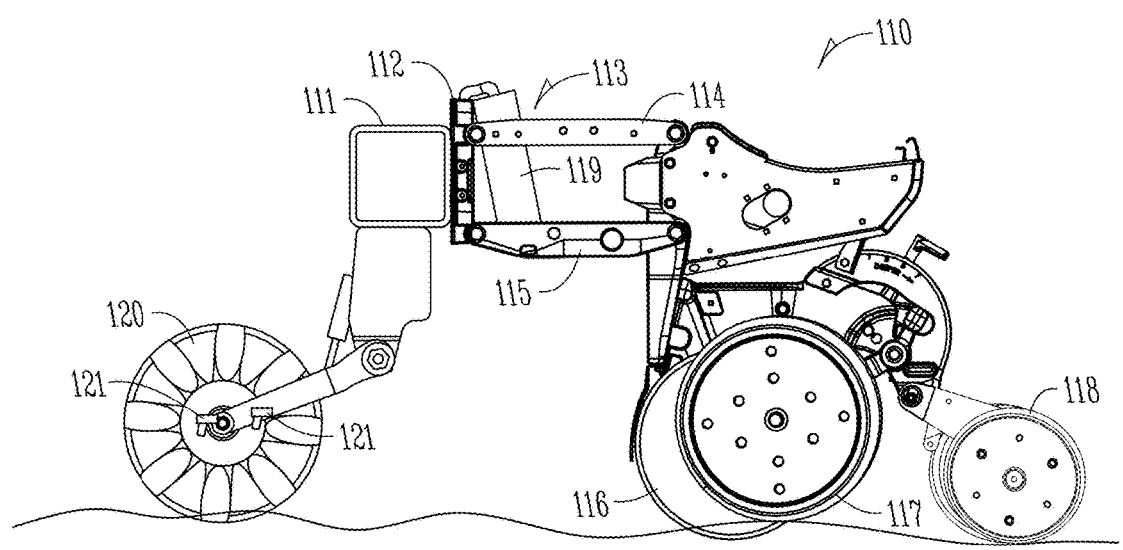
FIG. 14 is a side elevation view of a row unit for use with an agricultural planter showing additional aspects.

FIG. 14 is a side elevation view of a row unit 110 for use with an agricultural planter showing additional aspects of the invention. The row unit 110 is connected to the toolbar 111 via the fore bar linkage 113 having upper bars 114 and lower bars 115. Extending from the toolbar 111 is a leader wheel 120. The leader wheel 120 can include more than one wheel, and can include one or more load cells positioned there at. The load cells can obtain information related to the compaction and other soil conditions of the ground. The information obtained by the load cells 121 can then be sent to the down force actuator 119, which may be a linear actuator positioned between the upper and lower bars 113, 115 of the linkage 114 to adjust the down force pressured provided to the row unit 110.

For example, as the row unit 110 moves across a field, the opener wheel 116 will open a trench, the gauge wheel 117 will aid in maintain said trench depth, and a closing wheel 118 will close said trench. A seed will be positioned or deposited in the trench prior to closing of the trench. However, the soil conditions may change from one location to another, and/or an obstruction may appear in front of one or more row units. The leader wheel 120 of the system shown fit in FIG. 14 can determine a change or an obstruction prior to the location of a particular opener wheel 160. Said leader wheel can obtain the information via a load cell positioned thereon, and can send said information to the down force actuator 119 to adjust the down force pressure accordingly. For example, the down force pressure may be increased, decreased, or the row unit may be needed to be allowed to float, such as when an obstruction may appear.

Figure 15:
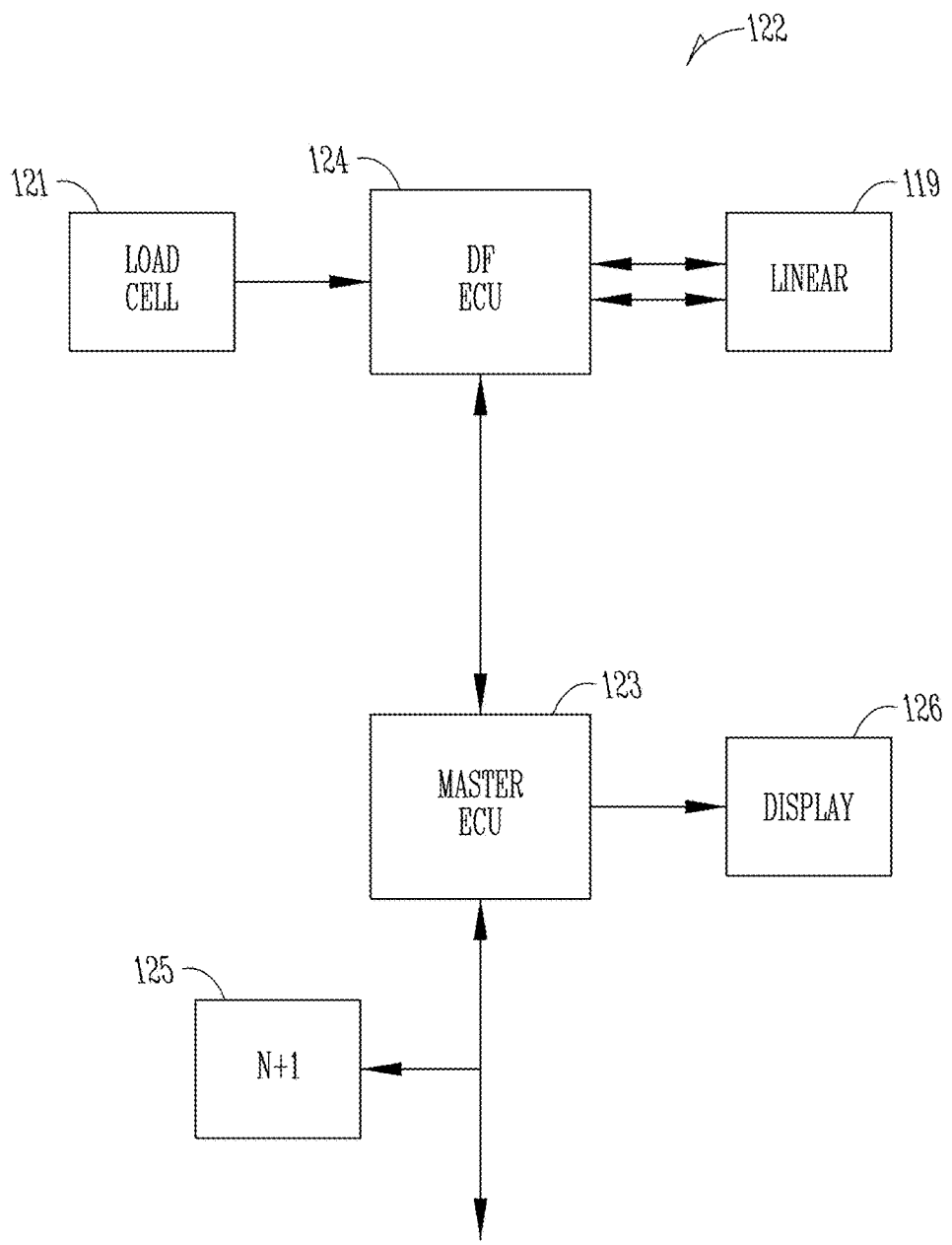
FIG. 15 is a schematic view of a block diagram showing components of the row unit of FIG. 14.
Figure 16:
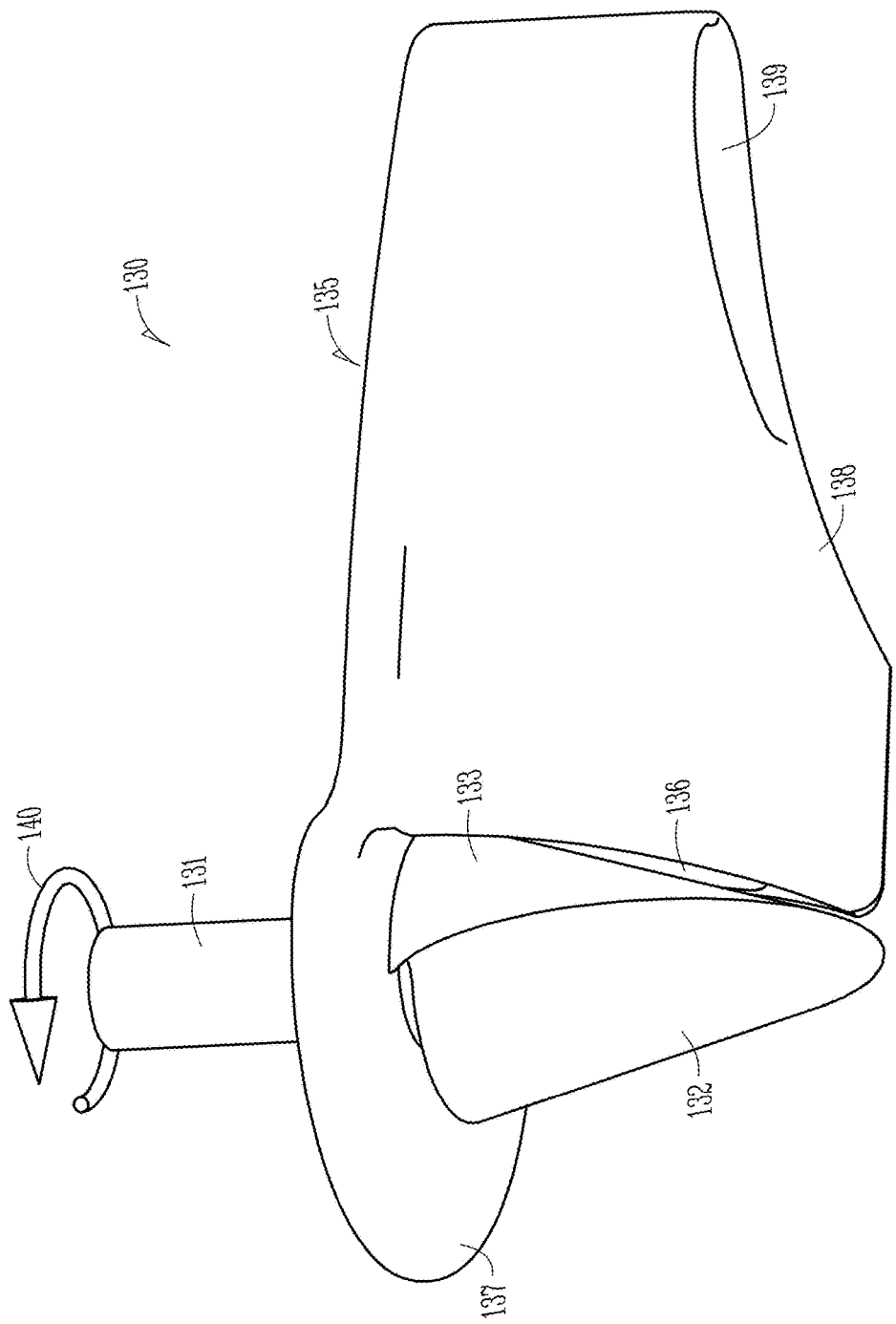
FIG. 16 is a perspective view of a rotating drill bit for use with a row unit according to aspects of the invention.
Figure 17:
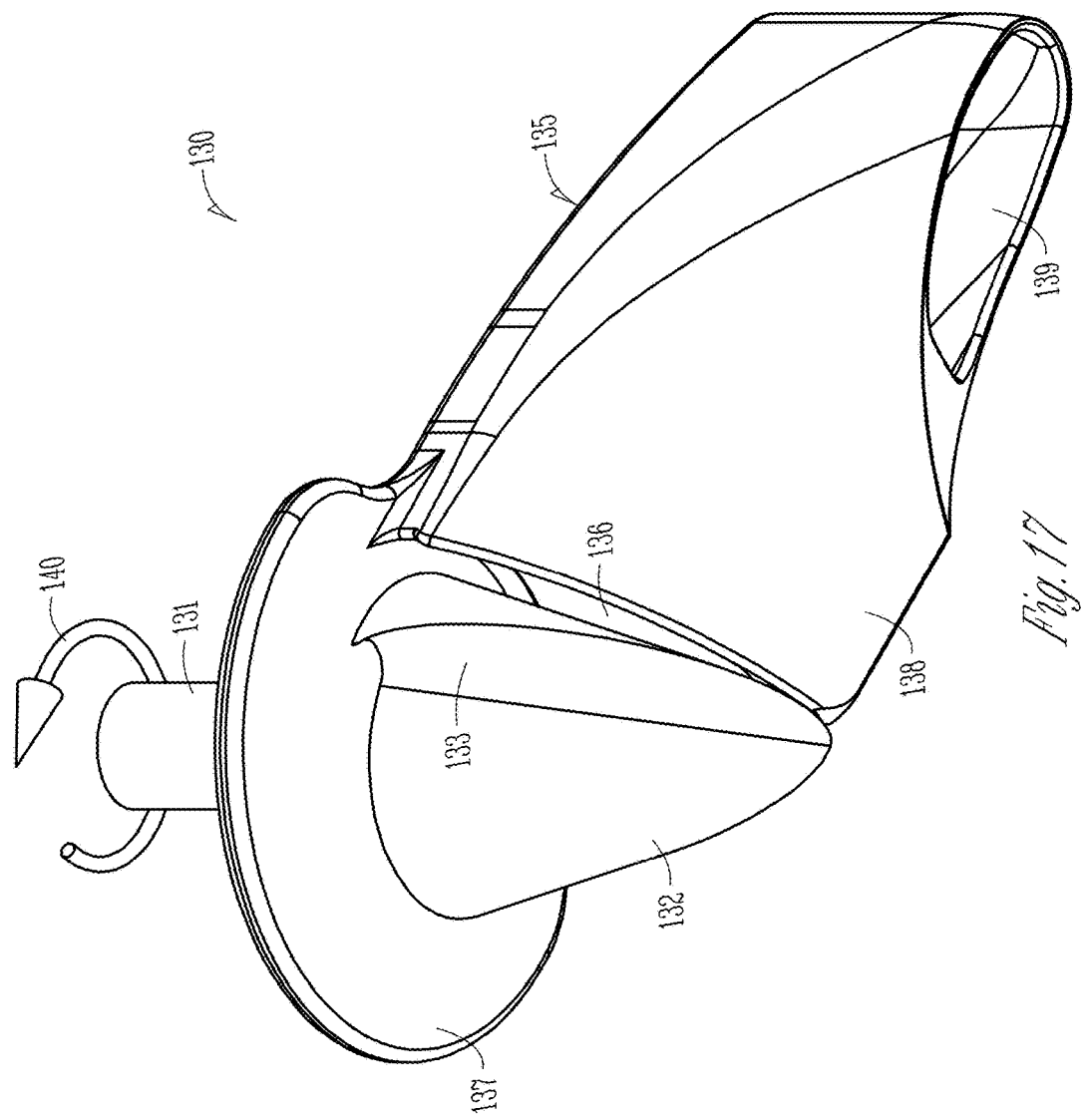
FIG. 17 is another perspective view of the rotating drill bit.
Figure 18:
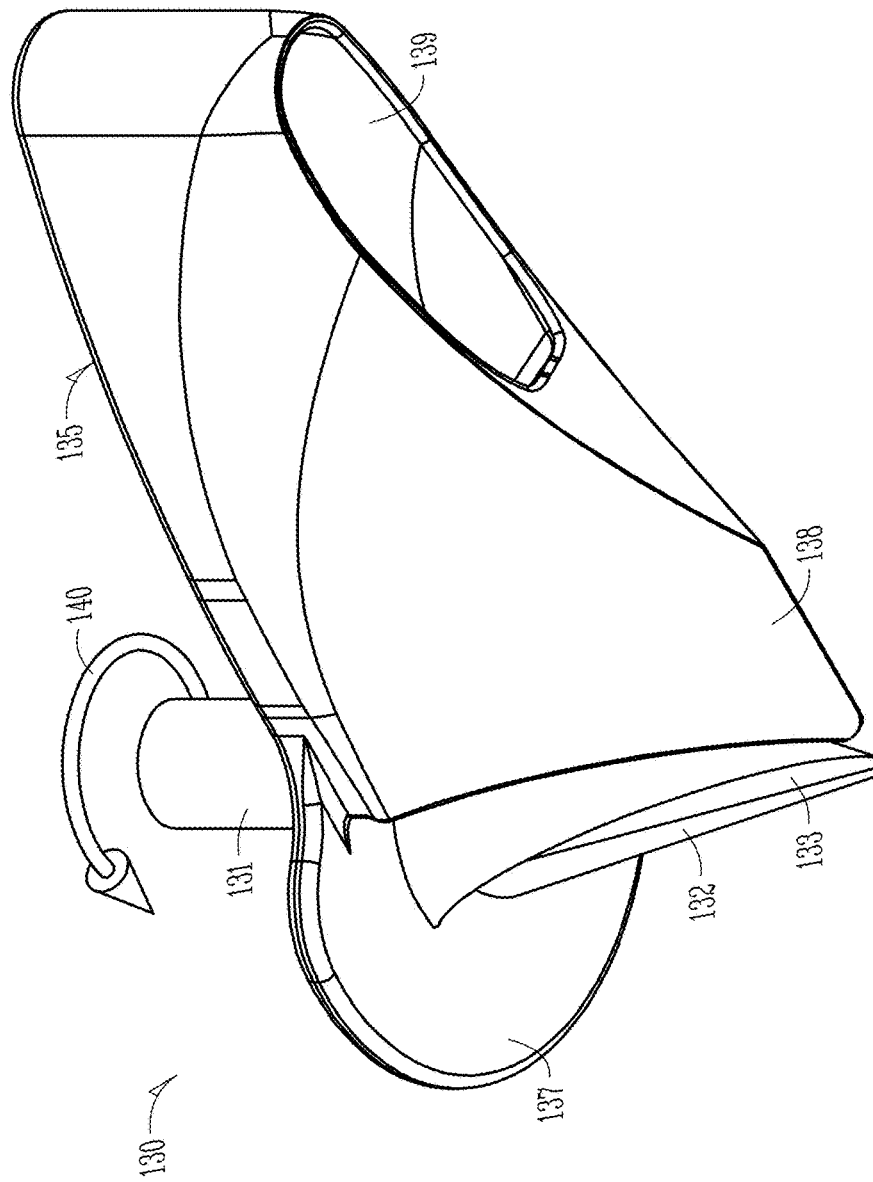
FIG. 18 is another perspective view of the rotating drill bit.
Figure 19:
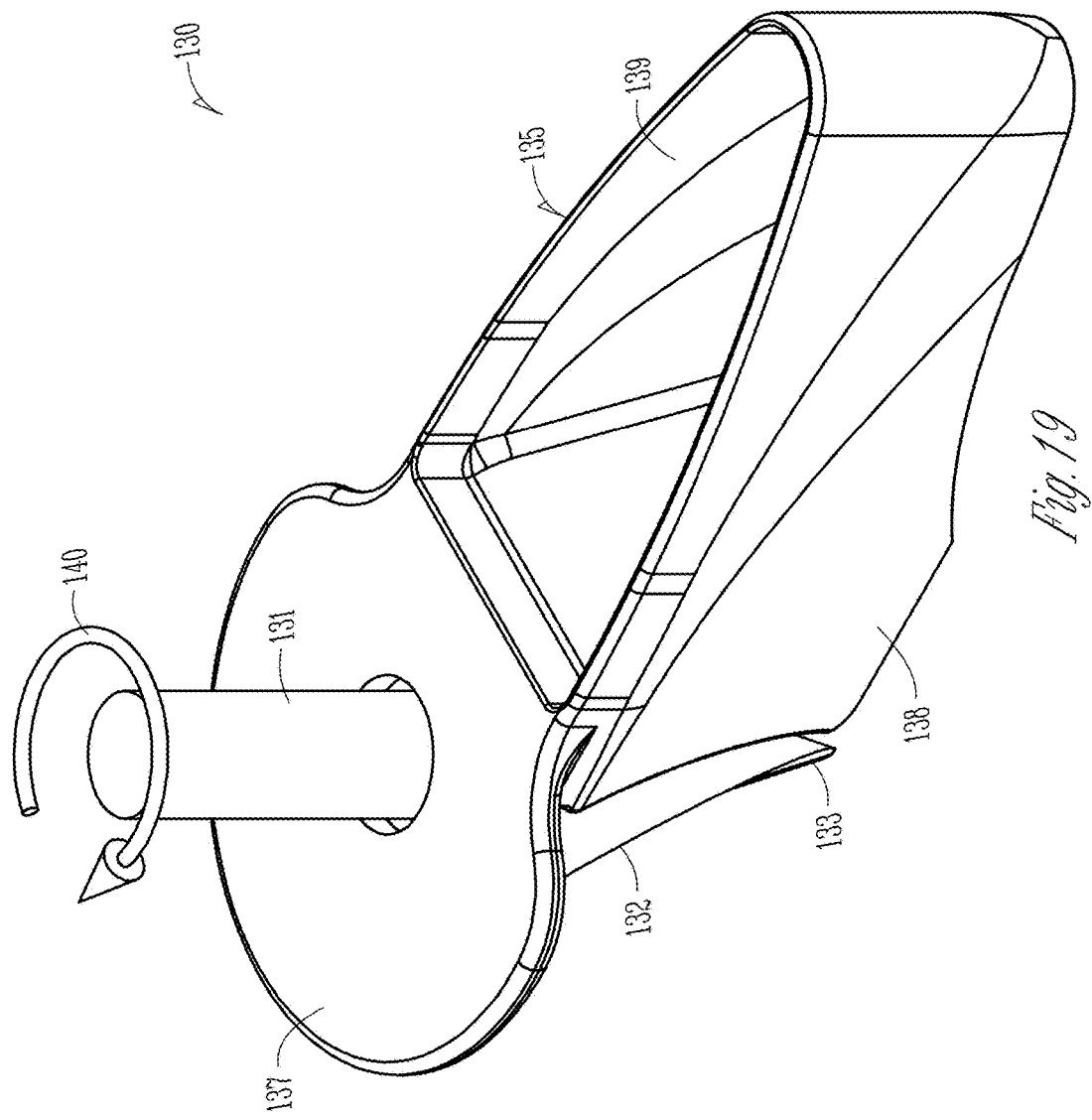
FIG. 19 is another perspective view of the rotating drill bit.

FIG. 15 is a schematic diagram showing components of the system of the row unit shown in FIG. 14. As shown in the schematic of FIG. 15, a master control unit 123 is included. Connected to the master control unit 123 are the down force control unit 124, load cell 121 and actuator 119 of a particular row unit. Also connected to the master control unit 123 is each additional row unit, which is shown by the box 125. The system 122 further includes a display and/or user interface 126, which is connected to the master control unit 123.

As shown in the system 122, the load cell 121 is connected to the down force control unit 124. Information is thus directed from the load cell 121 to the down force control unit 124, wherein the information is processed such that information can be sent to the actuator 119 to adjust the amount of down force provided or to provide for a fluidness of the actuator such that float is allowed of the components of the system. All instructions can then be sent to the master control unit 123, which can send the information to the display 126. Thus, an operator or other individual can view the information, which can include individual row unit down force values, changes therein, and any other issues related to the row units in order to view the amount of down force at each of the row units, and, also if there is any trouble there at. And, in a closed system, the operator can also set the amount of down force desired, and can view the down force of the row units to ensure that each of the row units are maintaining said down force values. In addition, when the system is in an open loop system, the operator can simply view to make sure that the amount of down force pressure provided by each of the row units is being updated as the conditions of the field change. This information can also be stored for later use, such as to map a field such that historically dry or wet areas can be mapped so that a future system can have a greater heads up in determining the amount of down force provided for said areas of a field.

While each of the row units heretofore shown and described have been connected to a toolbar in different manners, each has also included the use of traditional opener wheels for creating a trench or furrow for planting.

FIGS. 16-24 show an additional aspect of the invention, which can be utilized with or without the down force pressure providing mechanisms heretofore shown and described, and which replaces the traditional opener wheels of a row unit. FIGS. 16-24 disclose a rotating bit, which can be used in place of an opening wheel of a row unit. The rotating bit includes a shaft 131 connected to an opener mechanism 132, which is rotatably connected to a housing 135. The shaft and opener 132 may comprise a single, unitary element. Such element is rotated at a high speed in order to cause the shaft and rotating opening 132 at a very high rotational velocity. At the same time, the housing 135 can be maintained in a non-rotational, rigid manner with respect to the direction of travel of the row unit. As shown best in FIGS. 17 and 22, the opener 132 of the rotating bit 130 is generally conical shaped, and includes a first cutting face 133 and a second cutting face 134, which are formed generally 180° from one another, and in opposite orientation. Thus, as the bit rotates in the direction shown by the arrow 140 in the figures, the first and second faces 133, 134 will come in contact with the soil as the implement moves across a field. The shape of the faces, including a sharp cutting edge, will allow the opening 132 to cut through the field to create a trench therein. Therefore, it should be appreciated that the height of the opener member 132 can be selected to provide a desired depth of a trench created by the rotating bit 130. The shape and configuration of the rotating bit 130, which can be varied according to seed type being planted, field conditions, and other factors, will allow the planter to create a trench in a wide variety of field conditions, including soggy, muddy conditions and up to and not including compacted and hard field conditions.

Figure 20:
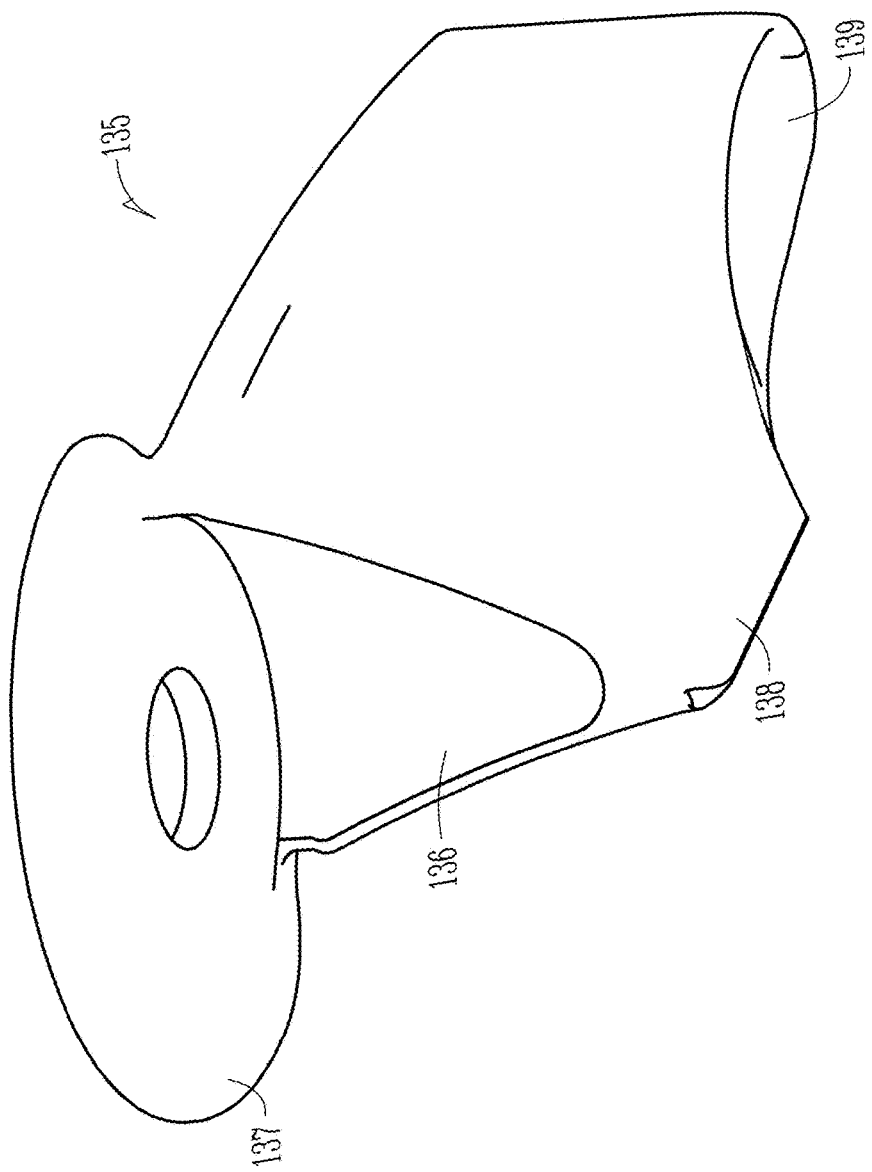
FIG. 20 is another perspective view of the rotating drill bit.
Figure 21:
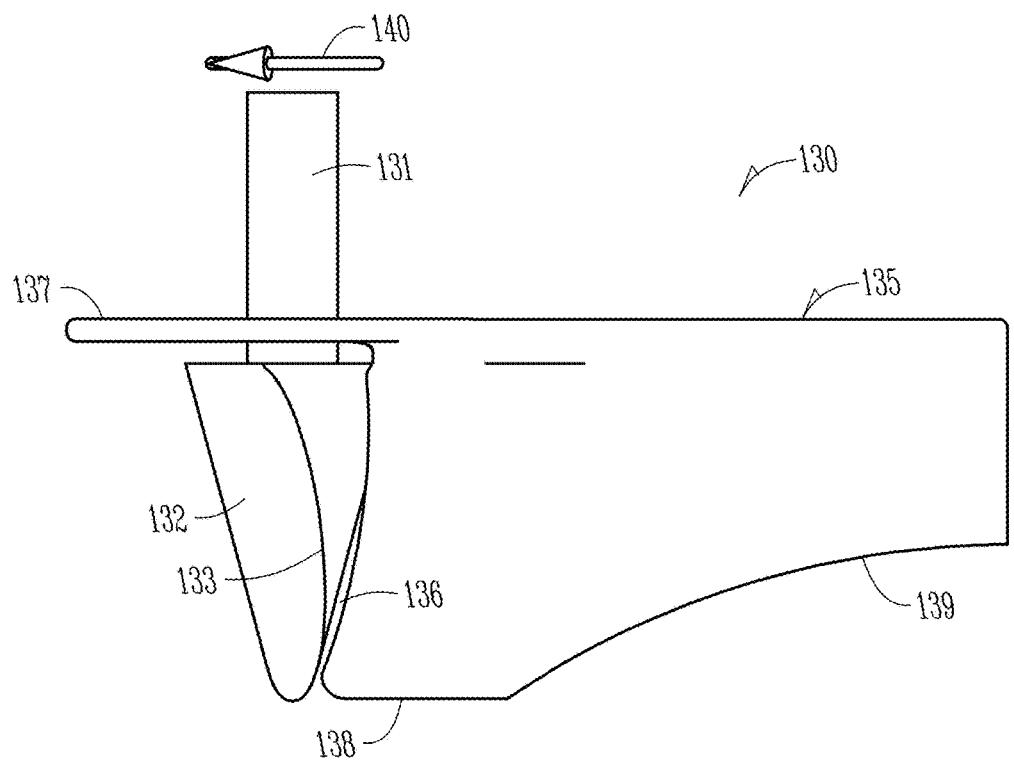
FIG. 21 is a side elevation view of the rotating drill.
Figure 22:
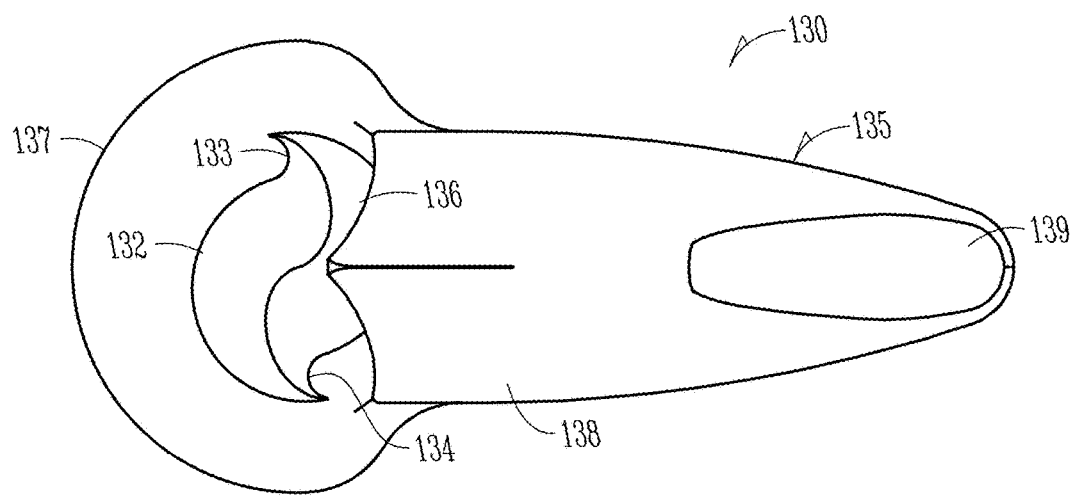
FIG. 22 is a bottom view of the rotating drill bit.
Figure 23:
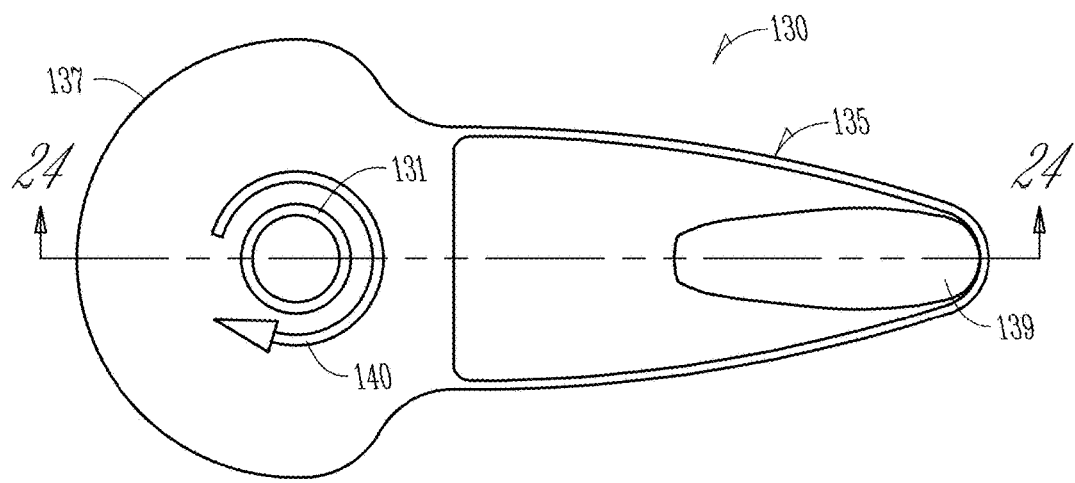
FIG. 23 is a top view of the rotating drill bit.
Figure 24:
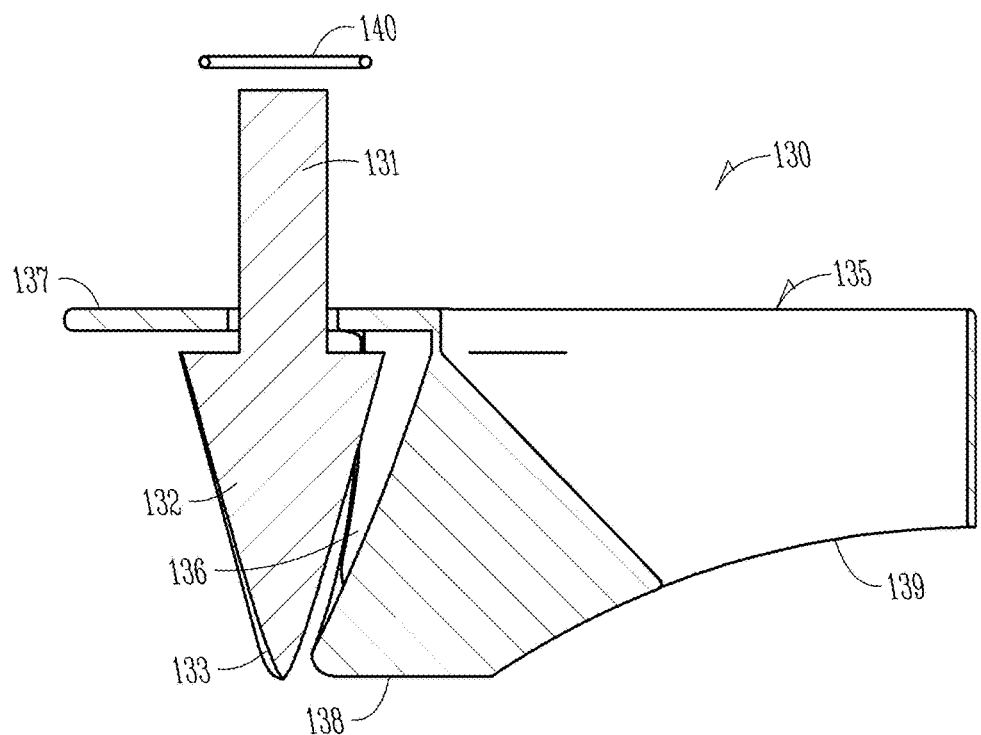
FIG. 24 is a sectional view according to the lines A-A of FIG. 23.

The housing 135, which is shown alone in FIG. 20, includes a rear bit fender-guard 136 and an above bit fender-guard 137. The rear guard 136 is positioned generally behind the rotating opener 132 of the bit 130. The above guard 137 is positioned generally between the upper portion of the opener 132 and the shaft 131 and includes a mechanism for allowing the shaft and opening 131, 132 to rotate relative to the housing 135. The guards 136, 137 also provide faces for protecting seed and other components of a row unit utilizing said rotating bit 130 from any line portions of the field which may be created by the high speed rotation of the opener 132. The opening 132 can comprise a carbide, nitride tool steel, diamond, or other relative hard materials. The rear guard 136 aids in cleaning the opener bit 132. The above guard 137 controls displaced soil created by said opener bit 132.

Other components of the rotating bit assembly 130 include a trench or furrow smoother 138 and a lower seed tube 139. The trench smoother 138 prevents the furrow created by the opener bit 132 from collapsing. Thus, it aids in pushing soil displaced by the opener outwardly to create walls for the trench. Said trench can then be closed by traditional closing wheels after a seed is deposited in said trench.

The lower seed tube 139 can be connected to or configured to be part of a lower end of a seed tube extending from a seed meter, as is known with traditional row units. Thus, seed that is displaced by the seed meter can be passed through a seed tube and into the lower seed tube 139 of the rotating bit assembly 130 to place the seed or deposit the seed in the formed trench created by the trench rotating bit 130.

The present invention has heretofore been shown and described. Other aspects obvious to those skilled in the art are to be considered part of the invention. For example, while the figures has shown generally a single row unit, it is to be appreciated that similar or different row units can be spaced and used along a toolbar of an agricultural implement. In addition, the rotating bit can be used in place of or in addition to the opening wheels of a road unit to create a trench for depositing a seed at a desired depth within a field, regardless of the field conditions.

Various aspects, not mentioned, but which are to be considered part of the invention, may be found in U.S. patent application Ser. Nos. 13/458,012, 13/457,815, and Ser. No. 13/457,577, which are all hereby incorporated in their entirety. Furthermore, it should be appreciated that the figures shown here and described are for exemplary purposes only, and are not to be considered the entirety of the invention.

What is claimed is:

1. An agricultural implement, comprising:
    a toolbar;
    a row unit coupled to the toolbar by a linkage, wherein the linkage includes a first arm and a second arm, and wherein each of the first arm and the second arm includes a first end coupled to the toolbar and a second end coupled to the row unit;
    an opening device for creating a furrow;
    an electric linear actuator operatively connected to the toolbar and linkage to provide a down force for the row unit to provide a substantially uniform furrow depth; and
    a vision sensor positioned to read an area of ground in front of the row unit to provide information to prepare the down force provided by the electric linear actuator.

2. The agricultural implement of claim 1, wherein the electric linear actuator comprises:
    a. a screw type actuator;
    b. a magnetic solenoid actuator;
    c. an electro-fluid actuator; or
    d. a damping system.

3. The agricultural implement of claim 1, further comprising a compressed gas associated with the electric linear actuator to dampen the load acted on the actuator as the implement moves through a field.

4. The agricultural implement of claim 1, further comprising one or more sensors positioned at one or more gauge wheels of the row unit, wherein the sensors will provide a measurement that can be utilized by the linear actuator to provide a sufficient amount of down force pressure to the row unit.

5. The agricultural implement of claim 1, further comprising a spring operatively connected to the electric linear actuator for aiding in providing down force for the row unit.

6. The agricultural implement of claim 5, wherein the electric linear actuator is operatively connected between the toolbar and a sliding mechanism, said sliding mechanism capable of moving relative to one of the upper or lower linkage bars.

7. The agricultural implement of claim 6, wherein movement of the electric linear actuator causes the sliding mechanism to move, thereby setting force of the spring acting upon the row unit.

8. A down force system for use with a row unit of an agricultural implement, comprising:
    an electric linear actuator operatively connected to a linkage of the row unit; and
    at least one vision sensor for sensing at least one soil characteristic and operatively connected to the electric linear actuator;
    wherein the at least one vision sensor monitors a portion of the ground in front of the row unit to determine the amount of down force needed to create a furrow based upon the at least one soil characteristic.

9. The down force system of claim 8, further comprising an intelligent control connected to the at least one vision sensor and the electric linear actuator to determine the amount of down force based upon the at least one soil characteristic.

10. The down force system of claim 9, wherein the electric linear actuator is temporarily disabled upon detection of an obstruction.

11. The down force system of claim 8, further comprising a compressed gas associated with the electric linear actuator to dampen the load acted on the actuator.

12. The down force system of claim 8, further comprising at least one spring operatively connected to the electric linear actuator to be set by the actuator to provide down force for the row unit.

* * * * *